United States Patent
Chakravadhanula et al.

(10) Patent No.: US 9,026,117 B2
(45) Date of Patent: May 5, 2015

(54) SYSTEMS AND METHODS FOR REAL-TIME CELLULAR-TO-INTERNET VIDEO TRANSFER

(75) Inventors: Kiran Chakravadhanula, Karnataka (IN); Abhinav Goyal, Karnataka (IN); Shamim A. Naqvi, Boston, MA (US)

(73) Assignee: Aylus Networks, Inc., Westford, MA (US)

( * ) Notice: Subject to any disclaimer, the term of this patent is extended or adjusted under 35 U.S.C. 154(b) by 1330 days.

(21) Appl. No.: 12/105,051

(22) Filed: Apr. 17, 2008

(65) Prior Publication Data

US 2008/0291905 A1 Nov. 27, 2008

Related U.S. Application Data

(63) Continuation-in-part of application No. 11/504,896, filed on Aug. 16, 2006, which is a continuation-in-part of application No. 11/709,469, filed on Feb. 22, 2007.

(60) Provisional application No. 60/800,688, filed on May 16, 2006, provisional application No. 60/809,029, filed on May 26, 2006, provisional application No. 60/923,918, filed on Apr. 17, 2007.

(51) Int. Cl.
*H04W 40/00* (2009.01)
*H04L 29/06* (2006.01)
*H04M 7/12* (2006.01)
*H04W 88/18* (2009.01)
(Continued)

(52) U.S. Cl.
CPC ......... *H04L 29/06027* (2013.01); *H04M 7/123* (2013.01); *H04M 7/1235* (2013.01); *H04W 76/00* (2013.01); *H04W 80/10* (2013.01); *H04W 88/18* (2013.01); *H04L 65/1016* (2013.01); *H04L 65/4015* (2013.01)

(58) Field of Classification Search
CPC ........... H04W 52/0222; H04W 52/286; H04L 2012/56; H04L 12/50; H04L 65/4023
USPC .......................................... 370/338; 455/445
See application file for complete search history.

(56) References Cited

U.S. PATENT DOCUMENTS

| 4,736,407 A | 4/1988 | Dumas |
| 4,925,311 A | 5/1990 | Neches et al. |

(Continued)

FOREIGN PATENT DOCUMENTS

| EP | 1672893 | 9/1988 |
| EP | 1435748 | 7/2004 |

(Continued)

OTHER PUBLICATIONS

International Search Report and Written Opinion, International Application No. PCT/US08/60656, Aylus Networks, Inc., Jul. 2, 2008, 8 pages.

(Continued)

*Primary Examiner* — Marcos Batista
(74) *Attorney, Agent, or Firm* — Stuart H. Mayer; Mayer & Williams PC

(57) ABSTRACT

The present invention provides systems and methods for real-time cellular to Internet video transfer during a voice call between an initiator and a recipient handset. In some embodiments, the systems and methods deliver the video stream in real-time from a cellular phone to a personal computer using the Internet.

25 Claims, 17 Drawing Sheets

(51) Int. Cl.
*H04W 76/00* (2009.01)
*H04W 80/10* (2009.01)

(56) References Cited

U.S. PATENT DOCUMENTS

| | | |
|---|---|---|
| 6,014,706 A | 1/2000 | Cannon et al. |
| 6,018,662 A | 1/2000 | Periyalwar et al. |
| 6,032,053 A | 2/2000 | Schroeder et al. |
| 6,047,194 A | 4/2000 | Andersson |
| 6,061,572 A | 5/2000 | Laiho |
| 6,067,529 A | 5/2000 | Ray et al. |
| 6,374,112 B1 | 4/2002 | Widegren et al. |
| 6,574,326 B1 | 6/2003 | Wong et al. |
| 6,608,832 B2 | 8/2003 | Forslow |
| 6,650,705 B1 | 11/2003 | Vetro et al. |
| 6,665,711 B1 | 12/2003 | Boyle |
| 6,675,196 B1 | 1/2004 | Kronz |
| 6,694,145 B2 | 2/2004 | Riikonen et al. |
| 6,782,412 B2 | 8/2004 | Brophy et al. |
| 6,795,912 B1 | 9/2004 | Itoh et al. |
| 6,847,632 B1 | 1/2005 | Lee |
| 6,857,021 B1 | 2/2005 | Schuster et al. |
| 6,888,828 B1 | 5/2005 | Partanen et al. |
| 6,950,655 B2 | 9/2005 | Hunkeler et al. |
| 7,024,198 B2 | 4/2006 | Knaebchen et al. |
| 7,076,554 B1 | 7/2006 | Kobayashi |
| 7,194,235 B2 | 3/2007 | Nykanen |
| 7,277,416 B1 | 10/2007 | Chang |
| 7,299,049 B2 | 11/2007 | Jagadeesan |
| 7,301,938 B2 | 11/2007 | Ejzak |
| 7,353,021 B2 | 4/2008 | Ejzak et al. |
| 7,519,075 B2 | 4/2009 | Tu |
| 7,637,424 B2 | 12/2009 | Silverbrook |
| 7,640,038 B2 | 12/2009 | Reddy |
| 7,720,489 B2 | 5/2010 | Engelhart, Sr. |
| 7,729,298 B2 | 6/2010 | Velagaleti et al. |
| 7,856,226 B2 | 12/2010 | Wong et al. |
| 8,065,402 B2 | 11/2011 | Chen et al. |
| 8,170,534 B2 | 5/2012 | Naqvi et al. |
| 2002/0059416 A1 | 5/2002 | Tuunanen |
| 2002/0064274 A1 | 5/2002 | Tuunanen et al. |
| 2002/0140726 A1 | 10/2002 | Schwartz et al. |
| 2002/0181462 A1 | 12/2002 | Surdila et al. |
| 2003/0026245 A1 | 2/2003 | Ejzak |
| 2003/0027569 A1 | 2/2003 | Ejzak |
| 2003/0027595 A1 | 2/2003 | Ejzak |
| 2003/0055974 A1 | 3/2003 | Brophy et al. |
| 2003/0134636 A1 | 7/2003 | Sundar et al. |
| 2003/0134640 A1 | 7/2003 | Kim et al. |
| 2003/0144008 A1 | 7/2003 | Rehkopf |
| 2003/0193426 A1 | 10/2003 | Vidal |
| 2003/0210683 A1* | 11/2003 | Bais et al. .................... 370/352 |
| 2004/0008669 A1 | 1/2004 | Bos et al. |
| 2004/0019539 A1 | 1/2004 | Raman et al. |
| 2004/0019901 A1 | 1/2004 | Spio |
| 2004/0043766 A1 | 3/2004 | Sashihara |
| 2004/0043776 A1 | 3/2004 | Tuomela et al. |
| 2004/0047437 A1 | 3/2004 | Hamiti et al. |
| 2004/0048612 A1 | 3/2004 | Virtanen et al. |
| 2004/0062230 A1 | 4/2004 | Taylor |
| 2004/0068574 A1 | 4/2004 | Costa Requena et al. |
| 2004/0076145 A1 | 4/2004 | Kauhanen et al. |
| 2004/0083195 A1 | 4/2004 | McCord et al. |
| 2004/0107143 A1 | 6/2004 | Niemi |
| 2004/0127251 A1* | 7/2004 | Thakkar et al. ............ 455/552.1 |
| 2004/0162892 A1 | 8/2004 | Hsu |
| 2004/0190498 A1 | 9/2004 | Kallio et al. |
| 2004/0193700 A1 | 9/2004 | Westman et al. |
| 2004/0193725 A1 | 9/2004 | Costa-Requena et al. |
| 2004/0205212 A1 | 10/2004 | Huotari et al. |
| 2004/0218571 A1 | 11/2004 | Pascazi |
| 2004/0219912 A1 | 11/2004 | Johansson et al. |
| 2004/0240430 A1 | 12/2004 | Lin et al. |
| 2004/0249887 A1 | 12/2004 | Garcia-Martin et al. |
| 2004/0249962 A1 | 12/2004 | Lecomte |
| 2004/0252673 A1 | 12/2004 | Ejzak et al. |
| 2004/0252674 A1 | 12/2004 | Soininen |
| 2004/0261116 A1 | 12/2004 | Mckeown et al. |
| 2005/0021494 A1 | 1/2005 | Wilkinson |
| 2005/0025047 A1 | 2/2005 | Bodin et al. |
| 2005/0025163 A1 | 2/2005 | Christie |
| 2005/0043020 A1 | 2/2005 | Lipsanen et al. |
| 2005/0047399 A1 | 3/2005 | Lee et al. |
| 2005/0050194 A1 | 3/2005 | Honeisen et al. |
| 2005/0058125 A1 | 3/2005 | Mutikainen et al. |
| 2005/0063329 A1 | 3/2005 | Lee |
| 2005/0083909 A1 | 4/2005 | Kuusinen et al. |
| 2005/0089020 A1 | 4/2005 | Ahlback et al. |
| 2005/0136926 A1 | 6/2005 | Tammi et al. |
| 2005/0141484 A1 | 6/2005 | Rasanen |
| 2005/0170861 A1 | 8/2005 | Niemi et al. |
| 2005/0180394 A1 | 8/2005 | Kautz |
| 2005/0190772 A1 | 9/2005 | Tsai et al. |
| 2005/0213606 A1 | 9/2005 | Huang et al. |
| 2005/0227681 A1 | 10/2005 | Li |
| 2005/0237933 A1 | 10/2005 | Marjelund et al. |
| 2005/0243870 A1 | 11/2005 | Balogh et al. |
| 2005/0245261 A1 | 11/2005 | Ejzak |
| 2005/0271011 A1 | 12/2005 | Alemany et al. |
| 2005/0286531 A1 | 12/2005 | Tuohino et al. |
| 2006/0007900 A1* | 1/2006 | Sylvain ........................ 370/338 |
| 2006/0015812 A1 | 1/2006 | Cunningham et al. |
| 2006/0025151 A1 | 2/2006 | Karaoguz et al. |
| 2006/0031888 A1 | 2/2006 | Sparrell |
| 2006/0062206 A1 | 3/2006 | Krishnaswamy |
| 2006/0083199 A1 | 4/2006 | Yang |
| 2006/0089143 A1 | 4/2006 | Jagadeesan |
| 2006/0104262 A1 | 5/2006 | Kant et al. |
| 2006/0114987 A1 | 6/2006 | Roman |
| 2006/0120287 A1 | 6/2006 | Foti et al. |
| 2006/0120339 A1 | 6/2006 | Akiyama |
| 2006/0121902 A1 | 6/2006 | Jagadeesan et al. |
| 2006/0126562 A1 | 6/2006 | Liu |
| 2006/0136557 A1 | 6/2006 | Schaedler et al. |
| 2006/0140150 A1 | 6/2006 | Olvera-Hernandez et al. |
| 2006/0155814 A1 | 7/2006 | Bennett et al. |
| 2006/0161512 A1 | 7/2006 | Schaedler et al. |
| 2006/0164550 A1 | 7/2006 | Yoshimoto et al. |
| 2006/0165050 A1 | 7/2006 | Erhart et al. |
| 2006/0183478 A1 | 8/2006 | Jagadeesan et al. |
| 2006/0193448 A1 | 8/2006 | Donoghue et al. |
| 2006/0209768 A1 | 9/2006 | Yan et al. |
| 2006/0221903 A1 | 10/2006 | Kauranen et al. |
| 2006/0246903 A1 | 11/2006 | Kong et al. |
| 2006/0256751 A1 | 11/2006 | Jagadeesan et al. |
| 2006/0258394 A1 | 11/2006 | Dhillon et al. |
| 2006/0262806 A1 | 11/2006 | Bouazizi |
| 2006/0276179 A1* | 12/2006 | Ghaffari et al. ............ 455/412.2 |
| 2006/0291412 A1 | 12/2006 | Naqvi et al. |
| 2006/0291419 A1 | 12/2006 | McConnell et al. |
| 2006/0291437 A1 | 12/2006 | Naqvi et al. |
| 2006/0291484 A1 | 12/2006 | Naqvi et al. |
| 2006/0291487 A1 | 12/2006 | Naqvi et al. |
| 2006/0291488 A1 | 12/2006 | Naqvi et al. |
| 2006/0291489 A1 | 12/2006 | Naqvi et al. |
| 2006/0294244 A1 | 12/2006 | Naqvi et al. |
| 2007/0002902 A1 | 1/2007 | Hannuksela |
| 2007/0008913 A1 | 1/2007 | Naqvi et al. |
| 2007/0008951 A1 | 1/2007 | Naqvi et al. |
| 2007/0014281 A1 | 1/2007 | Kant |
| 2007/0033286 A1 | 2/2007 | Min |
| 2007/0050510 A1 | 3/2007 | Jiang |
| 2007/0053343 A1 | 3/2007 | Suotula et al. |
| 2007/0053346 A1 | 3/2007 | Bettis et al. |
| 2007/0064676 A1* | 3/2007 | Peisa et al. .................... 370/352 |
| 2007/0066347 A1 | 3/2007 | Silverbrook et al. |
| 2007/0067807 A1 | 3/2007 | O'Neil |
| 2007/0091855 A1 | 4/2007 | Karaoguz et al. |
| 2007/0110043 A1 | 5/2007 | Girard |
| 2007/0111752 A1 | 5/2007 | Pazhyannur |
| 2007/0155310 A1 | 7/2007 | Borcic |
| 2007/0165572 A1 | 7/2007 | Lenzarini |
| 2007/0165599 A1 | 7/2007 | Skog |
| 2007/0174471 A1 | 7/2007 | Van Rossum |

(56) References Cited

U.S. PATENT DOCUMENTS

| | | |
|---|---|---|
| 2007/0197227 A1 | 8/2007 | Naqvi et al. |
| 2007/0201435 A1 | 8/2007 | Fisher |
| 2007/0207782 A1 | 9/2007 | Tran |
| 2007/0207802 A1 | 9/2007 | Palmer et al. |
| 2007/0207804 A1 | 9/2007 | Sharma et al. |
| 2007/0217349 A1 | 9/2007 | Fodor et al. |
| 2007/0217366 A1 | 9/2007 | Sagi et al. |
| 2007/0218924 A1 | 9/2007 | Burman et al. |
| 2007/0226344 A1 | 9/2007 | Sparrell et al. |
| 2008/0043717 A1 | 2/2008 | Bellora et al. |
| 2008/0075067 A1 | 3/2008 | Guglielmi |
| 2008/0092178 A1 | 4/2008 | McNamara et al. |
| 2008/0130637 A1 | 6/2008 | Kant et al. |
| 2008/0162637 A1 | 7/2008 | Adamczyk et al. |
| 2008/0261593 A1 | 10/2008 | Wong et al. |
| 2008/0276179 A1 | 11/2008 | Borenstein |
| 2008/0291902 A1 | 11/2008 | Chen |
| 2008/0291905 A1* | 11/2008 | Chakravadhanula et al. 370/355 |
| 2008/0316998 A1* | 12/2008 | Procopio et al. ............ 370/352 |
| 2008/0317010 A1 | 12/2008 | Naqvi et al. |
| 2009/0055473 A1 | 2/2009 | Synnergren |
| 2013/0262583 A1 | 10/2013 | Naqvi et al. |
| 2013/0308634 A1 | 11/2013 | Naqvi et al. |

FOREIGN PATENT DOCUMENTS

| | | |
|---|---|---|
| EP | 1545129 A1 | 6/2005 |
| WO | 01/54441 | 7/2001 |
| WO | 03/055913 | 7/2003 |
| WO | 2005/027460 | 3/2005 |
| WO | WO-2007/010070 A2 | 1/2007 |
| WO | 2007/100735 | 9/2007 |
| WO | WO-2007/117730 A2 | 10/2007 |
| WO | 2008/131109 | 10/2008 |
| WO | 2008/131118 | 10/2008 |
| WO | 2009/009167 | 1/2009 |

OTHER PUBLICATIONS

Definition of 'proxy' from dictionary.com, http://dictionary.reference.com/browse/proxy, printed Mar. 14, 2009 (5 pages).

European Search Report for European Patent Application No. EP08746133 mailed Jun. 25, 2010. (8 pages).

GSM Association: "Video Share Service Definition 2.0." Mar. 27, 2007. XP002585831. http://www.gmsworld.com/documents/se41.pdf>. Retrieved on Jun. 2, 2010. (28 pages).

International Search Report for Application No. PCT/US08/57367, Aylus Networks, Inc., Aug. 8, 2008, (7 pages).

International Search Report for International Application No. PCT/US07/04854, Aylus Networks, Inc., Jan. 31, 2008 (3 pages).

International Search Report for PCT/US 06/24624, mailed Apr. 3, 2007, (1 page).

International Search Report, International Application No. PCT/US 06/24619, date mailed Feb. 14, 2007, (2 pages).

Nokia Corporation: "Video Sharing, Enrich Your Voice Call with Video." Nov. 1, 2004. XP002336424. (12 pages).

OSGi Service Platform. Mar. 2003, The Open Services Gateway Initiative, Release 3. pp. 345-346, 505, 513-526 (602 pages).

Radvision Eli Oee, Jan. 21, 2003, EE Times, Understanding the 3G-324M Spec: Part 1, pp. 1-6.

Cheng-Yue Chang, An H.323 Gatekeeper Prototype: Design, Implementation, and Performance Analysis, Dec. 2004, IEEE Transactions on Multimedia, vol. 6, No. 6, pp. 937-939.

* cited by examiner

SYSTEMS AND METHODS FOR REAL-TIME CELLULAR-TO-INTERNET VIDEO TRANSFER

CROSS-REFERENCE TO RELATED APPLICATIONS

This application claims priority under 35 U.S.C. §119(e) to U.S. Provisional Patent Application No. 60/923,918, entitled "Systems and Methods for Real-Time Cellular-to-Internet Video Transfer," filed Apr. 17, 2007; and claims priority under 35 U.S.C. §120 as a continuation-in-part of U.S. patent application Ser. No. 11/709,469, filed Feb. 22, 2007, entitled Systems and methods for enabling IP signaling in wireless networks; and claims priority under 35 U.S.C. §120 as a continuation-in-part of U.S. patent application Ser. No. 11/504,896 (U.S. Patent Pub. No. 2007/0197227), filed Aug. 16, 2006, entitled System and Method for Enabling Combinational Services in Wireless Networks By Using a Service Delivery Platform, (which in turn claims priority under 35 U.S.C. §119(e) to U.S. Provisional Patent Application No. 60/800,688, filed May 16, 2006, entitled System and Method for Supporting Combinational Services Without Simultaneous Packet and Circuit Connections and to U.S. Provisional Patent Application No. 60/809,029, filed May 26, 2006, entitled System and Method for Supporting Combinational Services Without Simultaneous Packet and Circuit Connections), the disclosures of each of the above are incorporated herein by reference in their entirety.

BACKGROUND

1. Field of the Invention

This invention generally relates to wireless networks and to IP Multimedia Subsystem (IMS) networks, and more specifically to systems and methods for real-time cellular-to-internet video transfer.

2. Description of Related Art

Current wireless networks support circuit-switched (CS) and packet-switched (PS) connections. In some wireless networks, both types of connections may exist contemporaneously and be available to mobile handsets or user endpoints (UEs). In other wireless networks, a mobile handset may have access to either a CS connection or a PS connection but not both at the same time.

CS and PS networks will now be described in greater detail. In a CS network such as PLMN, users' network mobile handsets are connected to Base Transceiver Stations (BTS) through a radio access network. The BTS in turn are connected to a plurality of Base Station Servers (BSC) that in turn are connected to a network of Mobile Switching Centers (MSC). The MSC provide wireless services to the users' handsets, and are also inter-connected with the Public Switched Telephone network (PSTN). This arrangement makes it possible for voice traffic to be carried between mobile handsets and landline telephone sets. The MSC in a wireless network effectively behaves as a switch that supports the mobility and roaming functions of a user's handset.

When a user's handset requests a telephone call or a service, such as voice mail, a prepaid call, or a toll-free call, it generates a "call event" at the MSC. Each call event can potentially "trigger" one or more Trigger Detection Points (TDP) in the MSC. When a call event triggers a particular TDP, the MSC sends a pre-specified message to a Service Control Function (SCF). The message includes, for example, the phone numbers of the calling and called parties, and the nature of the service request. The SCF then "fields" the message, i.e., service logic within the SCF responds appropriately to the message. In WIN/CAMEL implementations, the MSC and SCF communicate using standards-based protocols such as Transaction Capabilities Application Part (TCAP) from the family of protocols commonly referred to as Signaling System 7 (SS7).

For example, consider a "call origination" call event that happens when a user makes a new call request at the MSC. This call event triggers a corresponding TDP, causing the MSC to send a message with event-related information to the SCF, e.g., the calling and called numbers. The SCF then processes the message, e.g., by querying an internal or external database to verify that the calling party is authorized to initiate telephone calls. The SCF then responds back to the MSC with a message that indicates whether the call is "allowed" or "denied."

In a PS network, services are generally supported by IP Multimedia Subsystem (IMS). The IMS architecture manages the network with several control functions, i.e., functional entities. The Breakout Gateway Control Function (BGCF) is an inter-working function that handles legacy circuit-switched traffic. A new function called the Media Gateway Control Function (MGCF) controls the Media Gateway (MGW). The Media Resource Function Processor (MRFP), which is controlled by the Media Resource Control Function (MRFC), performs media processing functions. An IMS session is controlled by a logical function called the Call State Control Function (CSCF). It is logically partitioned into three functional entities, the Proxy, Interrogating and Serving CSCFs. The Proxy Call State Control Function (P-CSCF) is the first contact point for a user's handset. The Interrogating CSCF (I-CSCF) is mainly the contact point within an operator's network for all IMS connections destined to a subscriber of that network operator, or a roaming subscriber currently located within that network operator's service area. The Serving CSCF (S-CSCF) actually handles the session states in the network. "Third party" application servers (AS) provide services to the mobile handset, such as voice mail, via the S-CSCF. The IMS controls packet services among the different functional entities with signaling protocols such as Session Initiation Protocol (SIP), which is an IP-based signaling protocol designed for multimedia communications.

When a mobile handset first powers on, logic residing in the handset initiates a "registration" procedure with the IMS core, first by requesting the radio access network to assign it an IP address. After it receives an IP address, the mobile handset attempts to register as an IP-enabled endpoint with the IMS core, by sending a "register" request to the P-CSCF. Assuming that the handset is registering from a visiting domain, the P-CSCF then uses a Domain Name Server (DNS) to search for the handset's home domain S-CSCF. Once the P-CSCF locates the S-CSCF for the mobile handset, it passes the "register" request to that S-CSCF. The S-CSCF contacts the Home Subscriber Subsystem (HSS), which looks up the mobile handset's profile. This profile contains assorted information about the user, and what services the handset is authorized to use. A logical function in the S-CSCF called the "registrar" then authenticates the mobile handset, e.g., verifies that the handset is legitimate.

The S-CSCF also loads Service Point Triggers (SPT) from the handset's profile. The SPT define the appropriate action for the S-CSCF to take when the handset or an AS requests a transaction. For example, if the handset requests voice mail service, the SPT triggers the S-CSCF to provide the addresses of the voice mail AS for the handset. So long as the handset is powered on, the SPT for that handset are loaded into the S-CSCF, so a service request fires the appropriate trigger in the S-CSCF. The SPT are analogous to the above-described TDP in the CS network. The SPT and TDP both trigger an appropriate response from a controlling server, e.g., the MSC or S-CSCF. However, the TDP are more generally applicable to call requests and call related events such as dialed number, etc., and are not particular to the user's profile. The SPT are specific to the mobile handset, and are stored in the user's profile in the HSS and loaded into the S-CSCF when the handset registers.

If an entity wishes to engage in a transaction with the mobile handset, e.g., to send a message to the handset, the entity utilizes an AS to send a request for the transaction to the S-CSCF. This triggers an SPT in the S-CSCF, which recognizes the request as pertaining to a registered handset and sends the appropriate information to the handset. Other ASs may not know which S-CSCF to contact in order to engage in a transaction with a particular handset. In this case, the AS interrogate a Subscriber Location Function (SLF), which provides information about a handset's S-CSCF to the AS, which then contacts that S-CSCF as described above. If the handset wishes to request a service, it sends the request to the S-CSCF, e.g., using a SIP invite. This triggers an SPT in the S-CSCF, which then directs the service request to a particular Application Server (AS), which then provides the service to the handset. For example, if the user wants to initiate an IMS call, it sends a SIP invite message to the S-CSCF, which may then contact the AS responsible for IMS calls, called the Back-to-Back User Agent (B2BUA), which initiates the IMS call flow.

Video conferencing and instant messaging with the support of web cams is quite popular on the Internet, but they are still between two personal computers as in the case of instant messaging or between two camera units in the case of Video conferencing. Cellular phones have had cameras on them for quite sometime now but the use of the internal camera in a cellular phone has generally been limited to taking pictures or videos and storing them on the phones internal memory or uploading recorded content to a website.

SUMMARY

The present invention provides systems and methods for real-time cellular to Internet video transfer. In some embodiments, the systems and methods transfer of video content in real-time from a cellular phone to a personal computer using the Internet. A user of a cellular phone "A" can record video using the phone's internal camera and transmit the video in real-time to a personal computer "B" via the Internet. While the video session is in progress, A and B can exchange textual messages between each other. Simultaneously, A can also be engaged in a voice call with another phone.

In one aspect, the invention provides a method for delivering a real-time video stream from an initiator handset to a recipient portal during a voice call between the initiator handset and a recipient handset carried over a circuit switched (CS) network, wherein only the initiator handset is on a wireless network utilizing multiple Radio Access Bearer (mRAB) technology, the method comprising: a packet switched (PS) network initiating a video stream transfer directed to the recipient handset over a PS network; a serving node (SN), residing on the PS network, intercepting the video stream transfer directed to the recipient handset; the SN forwarding the video stream to a portal server designated by the initiator handset; and a recipient portal retrieving the video stream from the portal server and presenting the video stream to the recipient during the voice call between the initiator and the recipient over the CS network, such that the recipient is able to view the video stream in real-time. The SN can contact the recipient handset to determine if the recipient handset is on a wireless network utilizing mRAB technology. Optionally, the SN can convert the video stream into a format that can be presented on the recipient portal prior to directing it to the portal server, for example, into a format is capable of being played in an internet browser.

The recipient portal (e.g., a computer) can retrieve the media stream from the portal server through the internet. In some embodiments, the portal server notifies the recipient portal of the video stream availability, for example, via an IM message, a SMS message, a MMS message, or an E-mail message.

The initiator handset can provide authentication requirement to the portal server. In this instance, the recipient portal needs to provide authentication information (e.g., a password) to the portal server to access the video stream.

In some embodiments, the video stream is generated by an internal camera on the initiator handset. The initiator handset can deliver a real-time or near real-time audio stream to the recipient concurrently with the video stream, wherein the audio stream is not part of the video stream.

In some embodiments, the initiator handset notifying the recipient handset via a SMS message, a MMS message, an IM message, an E-mail message or a voice call of the video stream. In some embodiments, the initiator handset is capable of exchanging SMS, MMS, IM or E-mail messages with the recipient handset or recipient portal during the transmission of the video stream.

In one embodiment, the video-stream has a custom border provided by the initiator handset.

Under one aspect, the systems and methods allow multiple personal computers to be able to receive the same real-time video broadcast streamed from a cellular phone.

Under another aspect, the systems and methods allow streaming of an audio channel as part of the video broadcast that is not part of the original video.

DETAILED DESCRIPTION

Figure 1:
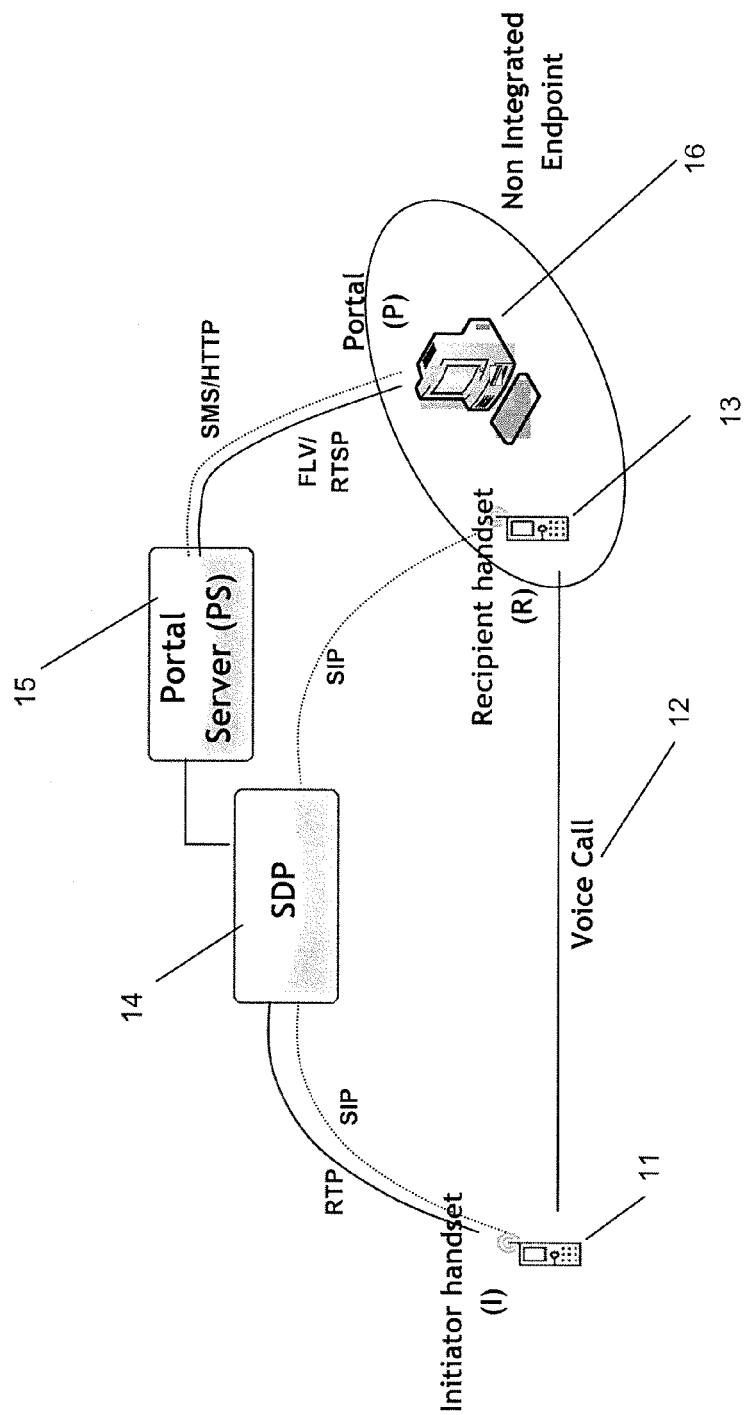
FIG. 1 illustrates an architecture allowing the cellular to internet video transfer according to one embodiment of the invention.

Embodiments of the present invention provide systems and methods for real-time cellular to Internet video transfer. Systems and methods of the invention deliver a real-time video stream from an initiator handset to a recipient portal (e.g., a computer) during a voice call between the initiator handset and a recipient handset. Because only the initiator handset (but not the recipient handset) is on a wireless network utilizing multiple Radio Access Bearer (mRAB) technology, the initiator handset cannot stream the video in real-time directly to the recipient handset, while the two handsets are engaged in a voice call. However, the initiator handset can stream the video in real-time to a computer in proximity of the recipient, such that the recipient can view the video on a computer while engaged in a voice call with the initiator. In some embodiments, one or more computers can access the recipient portal and view the video in real-time via the Internet. The systems and methods can utilize existing call-forwarding technology to provide the service.

Combinational Services

Recent developments in wireless services have concentrated on so-called Combinational Services that make use of simultaneous CS and PS connections. In most variants of such services the CS connection is used to carry voice between the calling and called parties, whereas the PS connection is used to carry multimedia data (live video, video clips, music videos, audio clips, images, etc.) between the same two parties. Other names used for such services include but are not limited to Video Share, See What I See, etc., some of which are described in greater detail in the incorporated patent references. Standards bodies such as 3GPP and associations such as GSM have announced standard's activities and Inter-operability trials involving such services.

Combinational services are gaining popularity amongst wireless operators worldwide and several such operators have expressed interest in offering such services to their subscribers. It has been estimated that 900 million handsets will be capable of receiving simultaneous CS and PS connections by the year 2011, i.e., will be capable of supporting combinational services. More than 50% of handsets manufactured today contain cameras and other appurtenances for supporting the rendering of multimedia objects. As has been stated before a combinational service, as envisioned by 3GPP, uses the CS connection for carrying voice and uses the PS connection for carrying the multimedia objects, simultaneously. Often cited examples of combinational services are as follows:

1. Transmitting of (high-resolution) images from one party to another while conversing; the transmitted image is then rendered on the receiving party handset by service logic local to said handset;

2. Transmitting and subsequent rendering of music video and video clips from sending handset to receiving handset;

3. Transmitting and subsequent rendering of audio clips and files from sending handset to receiving handset; and 4. Transmitting of live video captured by equipment on sending handset to a receiving handset and subsequent rendering of such video on the A/V output equipment of the receiving handset.

Since different wireless networks depend on a variety of different technologies whose capabilities to support CS and PS connections vary widely, different systems and methods may be needed for different wireless technologies so that the coordination is reasonably accurate and no extraneous delay or "lag" is introduced to the voice call setup time.

We begin by describing IP signaling in mobile devices and how IP connectivity can be re-established if handset becomes not IP-accessible. We then describe how a CS network can be used to initiate connection to the PS network using a service delivery platform (SDP). We then focus our attention on the Serving Node (SN) and the personal agent (PA) components of the SDP. Finally, we describe the details of the system and methods for real-time cellular-to-internet video transfer.

IP Signaling in Mobile Devices

As is known to persons skilled in the art, in some circumstances a network operator may disconnect a mobile handset from a packet-switched (PS) network by withdrawing its IP address. For example, if a first mobile handset registers to the IMS network, thus obtaining an IP address, but then does not use its IMS connection for a specified period of time, the network may withdraw its IP address and assign that address to a second mobile handset. In this case, the first handset is disconnected from the IMS network, and thus no longer IP accessible until it re-registers to the IMS network. When a handset loses its IP address and is disconnected from the IMS network, it can no longer participate in IP-based services. Systems and methods described below allow another entity, such as another handset or a network entity, to send an IP-based message to a handset that lacks an IP address, in effect "waking up" the handset and causing it to initiate its own request for an IP address, so that it can receive the IP-based message.

Uses of IP Signaling in Mobile Services

As an example of an IP service that would benefit from user-to-user (handset-to-handset) IP signaling, consider the case in which party A wishes to place a voice call to party B, and to transmit a photograph as part of "call alerting." It is expected that party B will receive the call alert (indicated by "ringing") and the photograph synchronously, e.g., party B may use the photograph to identify the calling party. In order to transmit the image to party B, party A's handset needs to establish a packet connection to party B's handset and negotiate resources and capabilities. However, if party B's handset is disconnected from the IMS network, party A's handset cannot send the photograph to party B's handset. Further details on this kind of interaction may be found in U.S. Patent Pub. No. 2007/0197227, the entire contents of which are incorporated herein by reference.

As an example of an IP service that would benefit from network-to-user (network-to-handset) IP signaling, consider the case in which a network server wishes to transmit a multimedia object to a mobile handset. In order to begin transmitting the object, the server needs to know the capabilities of the handset. If the handset is not IP accessible, the network server may not reach the handset to begin resource negotiation or to transmit the object.

Conditions Under which Handsets May not be IP-Accessible

Figure 13:
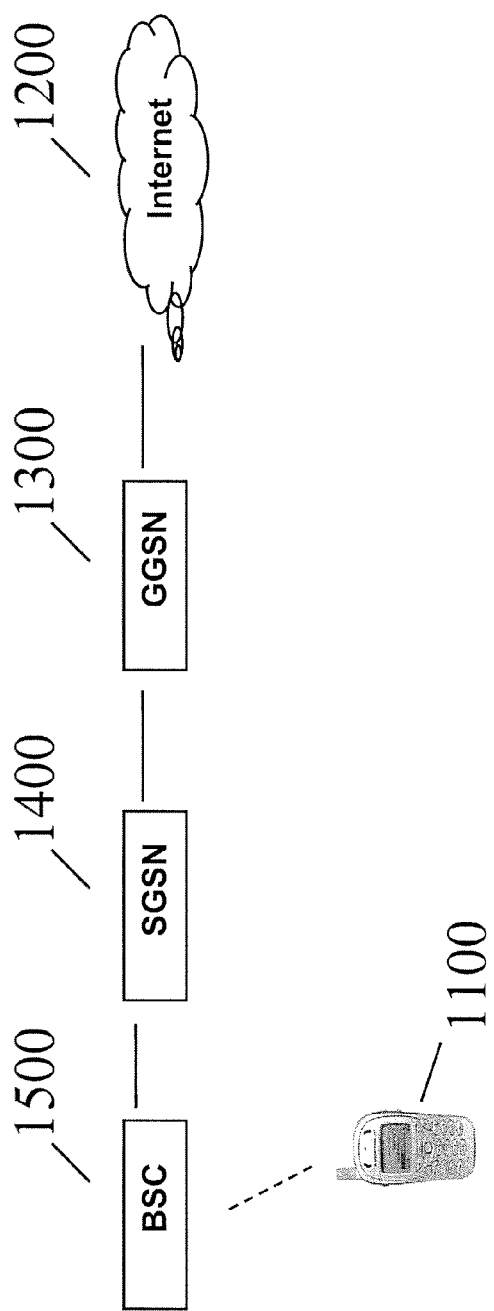
FIG. 13 illustrates a GSM/GPRS packet-switched network architecture.

FIG. 13 depicts components in a GSM/GPRS packet-switched (PS) network, and their communication pathways to an IP network, e.g., the Internet 1200, and to handset 1100. The GSM/GPRS network includes one or more Base Station Servers (BSC) 1500, which are in communication with handset 1100, Serving Gateway Support Node (SGSN) 1400, and GPRS Gateway Support Node (GGSN) 1300, which is in communication with Internet 1200. GGSN 1300 and SGSN 1400 work collaboratively to assign an IP address from Internet 1200 to mobile handset 1100. Specifically, GGSN 1300 communicates with Internet 1200, and allocates IP addresses for user handsets, e.g., handset 1100. SGSN 1400 communicates with GGSN 1300 and with base station server (BSC) 1500 to provide a wireless connection between handset 1100 and Internet 1200. When this is accomplished, it is said that mobile handset 1100 has a Packet Data Protocol (PDP) context.

Most network operators implement a policy that de-establishes the PDP context of a mobile handset when it is not used. Such de-commissioning is typically implemented within a time period of a few minutes. When the handset loses its PDP context, it does not have an IP address assigned to it and is not reachable by IP-based addressing schemes. At some time in the future, the handset may initiate a data request, causing a new PDP context to be established for this handset, including obtaining a new IP address to the handset. In other words, if a handset lacking an IP address requests an IP connection, then it can initiate that connection, but if another entity requests an IP connection with a handset lacking an IP address, the entity cannot itself establish that connection. It is possible for a network operator to assign a "static" IP address to a mobile handset, so that it will remain connected to the IP network, but this is atypical because IP addresses are a valuable resource in short supply.

Figure 14:
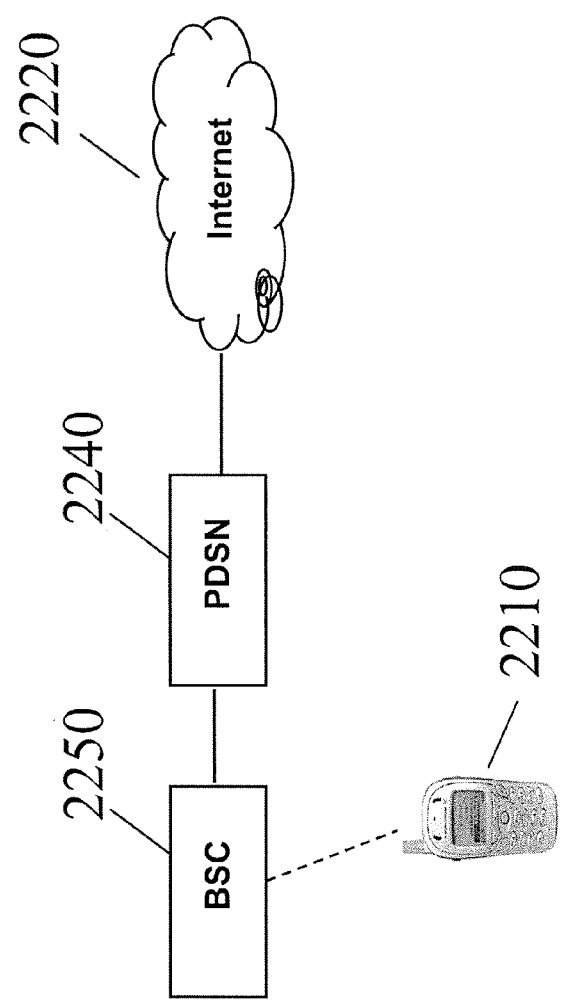
FIG. 14 illustrates a CDMA circuit-switched network architecture.

FIG. 14 depicts components in a CDMA circuit-switched (CS) network, and their communication pathways to an IP network, e.g., Internet 2220, and to mobile handset 2210. The CDMA network includes one or more Base Station Servers (BSC) 2250, which are in communication with handset 2210, and Packet Data Serving Node (PDSN) 2240, which is in communication with Internet 2220. A Point-to-Point protocol (PPP) session exists between the mobile handset 2210 and PDSN 2240. PDSN 2240 acts as a connection point between BSC 2250 and an IP network, e.g., Internet 2220, by assigning handset 2210 an IP address from Internet 2220 and providing access to the Internet 2220. As practitioners skilled in the art know, the PPP session may be maintained even if the handset goes "dormant," so the handset will remain IP-accessible. An incoming packet for a dormant mobile handset then waits at the packet control function (PCF) upon a "mobile origination" message from the handset in response to overhead messages generated collaboratively by the PCF and the BSC. However, network operators in such networks typically choose to de-allocate IP addresses and tear down the PPP session in order to conserve IP addresses, if the mobile handset does not use its PPP session for a specified period of time. If the mobile handset 2210 does not have a PPP session, other entities cannot contact it via the IP network.

Even if a mobile handset is not IP-accessible, e.g., because the GSM/GPRS or CDMA network has de-allocated its IP address, it still has a connection to the circuit-switched (CS) network; as described above, the CS connection can be used to initiate and receive voice calls, SMS and other circuit-switched services.

Systems and Methods for Initiating IP Connectivity to Handsets Lacking IP Addresses If a mobile handset lacks an IP address and so cannot be directly contacted by another entity, the handset's existing CS connection can be exploited to cause the handset to initiate its own connection to the PS network. Specifically, a specified message, or "trigger," is sent to the handset via the CS network, instructing logic residing on the handset to initiate a connection to the PS network.

One system that can facilitate this interaction is the Service Delivery Platform (SDP) described in detail in U.S. Patent Pub. No. 2007/0197227. Descriptions of other systems and/or components may be found in the incorporated patent references, given below. An overview of the service delivery platform is provided below.

Overview of Service Delivery Platform

Briefly, the SDP includes a Serving Node (SN) that may communicate with both the CS voice network and the packet-switched network (with or without IMS). The SDP also includes a Personal Agent (PA), which is a piece of service logic that resides in the mobile handset(s). The PA and the SN can send messages to each other, e.g., regarding services the user would like to use, the local network environment of the handset, or instructions the SN would like the PA to execute on the handset.

The service delivery platform includes a Serving Node (SN) that supports combinational services by communicating with both the circuit-switched voice network and the packet-based IMS network. In particular, the SN is simultaneously aware of the states of the Service Control Function (SCF) services of a voice call between User Endpoints (UE), and of the registration states of UEs involved in a packet session. The service delivery platform also includes a Personal Agent (PA), which is a piece of service logic that resides in the UEs. The PA sends messages to the SN regarding services that the user would like to use, and also regarding its local network environment. The SN then responds appropriately by making appropriate voice network and/or IMS network services available to the user. Thus, the service delivery platform has one "eye" on the circuit-switched voice network and another "eye" on the IMS network, allowing it to deliver combinational services to users without needing to upgrade the existing network to 3G.

Figure 15:
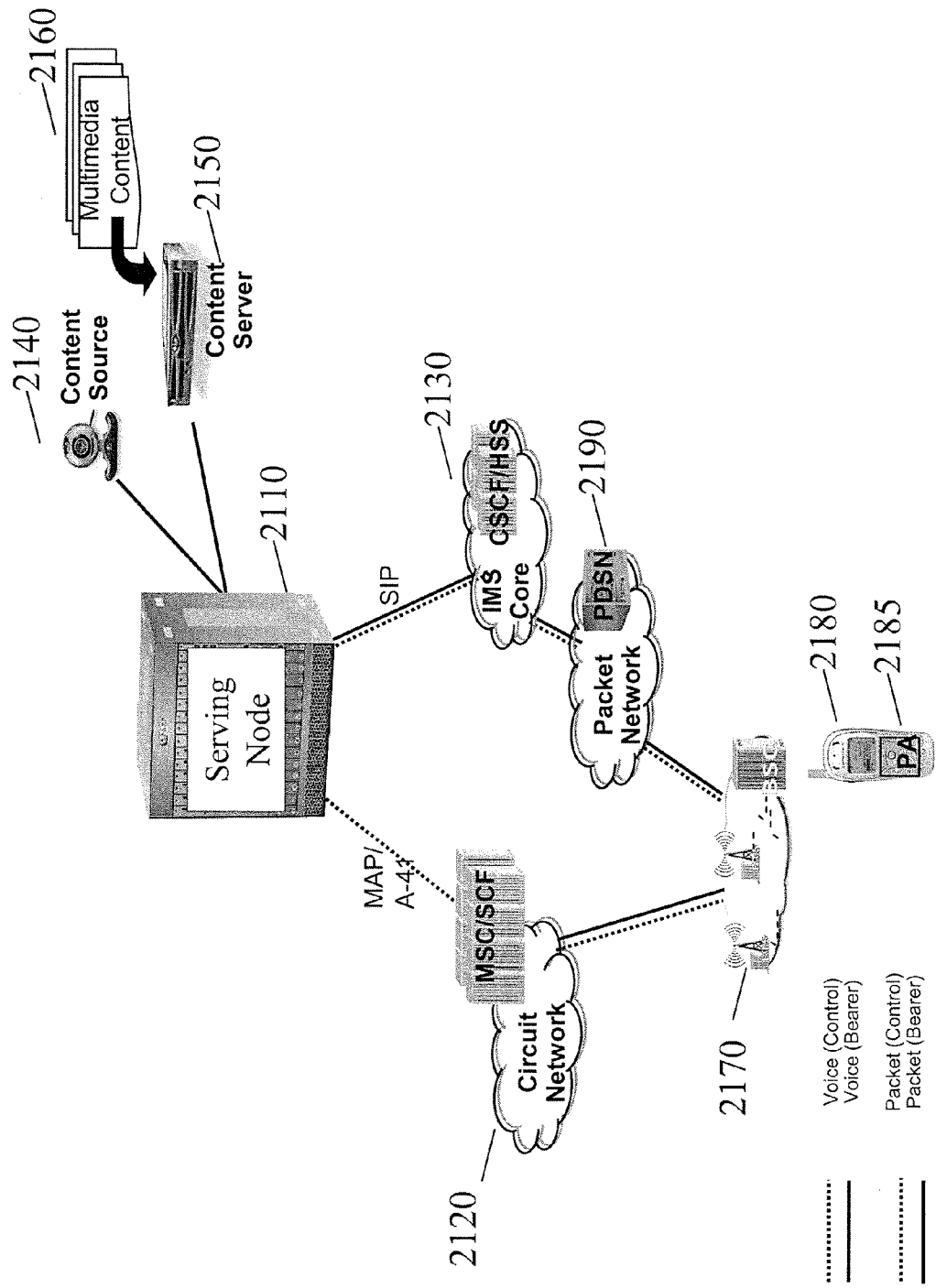
FIG. 15 illustrates an overview of the service delivery platform (SDP) and its connections to the circuit-switched (CS) and packet-switched (PS) networks.

FIG. 15 is an overview of the service delivery platform and its connections to the circuit-switched and packet-switched networks. The service delivery platform includes SN 2110 and PA 2185, which resides on UE 2180. As discussed in greater detail below, SN 2110 and PA 2185 communicate with each other via the existing circuit-switched and packet-switched network infrastructures in order to provide combinational services to the user.

The existing "2G" infrastructure includes radio access network 2170, circuit-switched (CS) network 2120, packet-switched (PS) network 2190, and IMS core 2130. As described above, CS network 2120 includes Mobile Switching Center(s) (MSC) that provides wireless voice services to UE 2180 over radio access network 2170. PS network 2190 includes Packet Data Serving Node(s) (PDSN) that act as the connection point between radio access network 2170 and IMS core 2130. IMS core 2130 includes CSCF(s) and HSS(s) that provide multimedia services to UE 2180 via PS network 2190 and radio access network 2170. However, as noted above, even if UE 2180 is capable of processing signals from either network, i.e., can process a voice call or a multimedia session, radio access network 2170 cannot support simultaneous connections between UE 2180, CS network 2120, and PS network 2190. In other words, CS network 2120, PS network 2190, and radio access network 2170 are not, by themselves, capable of providing combinational services to UE 2180.

The service delivery platform provides combinational services to UE 2180 as follows. SN 2110 communicates both with CS network 2120 and with IMS core 2130, and appears like a normal system component to each of the two networks.

In CS network 2120, normally when UE 2180 requests a voice call or other service on CS network 2120, the request triggers a Trigger Detection Point (TDP) at the MSC, and the MSC then sends a pre-specified message to a Service Control Function (SCF) that responds appropriately. The message includes, for example, the phone numbers of the calling and called parties, and the nature of the service request. However, in the service delivery platform, the MSC is programmed to provide the pre-specified message to SN 2110 instead of to the SCF. Logic operating in SN 2110 then processes the message, much as the SCF normally would, and returns a completion code to the MSC indicating that it may now proceed to process the voice call request. SN 2110 thus learns information about services on the circuit-switched network that UE 2180 invokes, e.g., the phone numbers of the calling and called parties, and the nature of the service, and also can authorize or even modify the service request when it returns the completion code to the MSC on CS network 120. Thus, SN 2110 looks like an SCF to the MSC. SN 2110 provides a control path to the CS network, but not a bearer path.

In the IMS core 2130, the S-CSCF normally communicates with "third party" ASs in order to provide services to UE 2180. Specifically, if an AS wants to communicate with UE 2180, it sends a request to the S-CSCF which triggers a Service Point Trigger (SPT) in the S-CSCF. The SPT are analogous to the TDP of the MSC in the CS network 2120, with some differences, as described in greater detail above. The SPT causes the S-CSCF to communicate appropriately with the UE 2180. If UE 2180 wants to communicate with an AS, i.e., to receive a service, it sends a SIP message to the S-CSCF, which triggers an SPT that instructs the S-CSCF to contact an AS to provide that service. In the described service delivery platform, SN 2110 operates much like an AS, and indeed looks like an AS to the IMS core 2130. When SN 2110 wants to contact UE 2180, it sends a transaction request to the S-CSCF, where it generates an SPT for the S-CSCF to forward the request to the UE. If UE 2180 wants to contact the SN 2110, it sends a SIP invite message to the S-CSCF, which generates an SPT for the S-CSCF to send the request to SN 2110. The SN 2110 then uses service logic to execute that request. Thus, in order to inter-work IMS 2130 and SN 2110, the S-CSCF simply needs to be configured to recognize the SN 2110 as an AS. This allows SN 2110 to learn about the packet-based connections that the UE and/or AS make with the S-CSCF. SN 2110 provides both control and bearer connectivity to the IMS core 2130 and external endpoints. Methods of interaction between SN 2110 and the IMS core 2130 are discussed in greater detail in U.S. Patent Pub. No. 2006/0291488, the entire contents of which are incorporated herein by reference.

To readily communicate with CS network 2120 and IMS core 2130, SN 2110 supports protocols for CS communications, e.g., SS7, and protocols for PS/IMS communications e.g., IP. For example, if SN 2110 is exchanging a message with PA 2185 in circuit-switched mode, it may use DTAP and if SN is exchanging a message with PA 2185 in packet-switched mode, it uses SIP. DTAP (Direct Transfer Application Part) is a protocol that carries messages between the handset and a switch and which is not interpreted by the intervening radio access network. Other protocols, such USSD (Unstructured Supplementary Services Data) can also be used. The protocol the service delivery platform, i.e., SN 2110 and PA 2185, uses depends on which network is more appropriate for the message.

In general, the triggering mechanisms such as TDP and SPT are examples of mechanisms that can be used to transfer information from the CS network 2120 and the IMS core 2130 to SN 2110; any mechanism that allows SN 2110 to learn sufficient information about the UE's connections to the two networks can be used. One example is Unstructured Supplementary Services Data (USSD).

In addition to signaling traffic, SN 2110 can also receive media traffic from content source(s) 2140, e.g., camcorders or digital cameras, and content server(s) 2150 that are capable of providing multimedia content 2160. This functionality is described in greater detail below.

Serving Node Component of Service Delivery Platform

As described above, SN 2110 communicates with CS network 2120 and IMS core 2130. As illustrated in FIG. 14, SN 2110 includes Load Balancer/Admission Control 2221, which includes a series of load balancing functions that handle incoming signals from CS network 2120 and IMS core 2130. Load Balancer/Admission Control 2221 then passes the signals to Signaling Adaptation Layer (SAL) 2222, which aggregates the signals into a common internal form.

Call Leg Manager (CLM) 2223 then logically processes the aggregated signals. As will be readily apparent to skilled practitioners in the art, call models used to describe telephone connections often split call states in one or more "call legs." In combinational services since both a voice call and a packet connection may exist contemporaneously the various call legs are integrated into a single logical session by another function called the General Call Session Manager (GCCM) 2232. Control of call legs is discussed in greater detail in U.S. Patent Pub. No. 2006/0291488, the entire contents of which are incorporated herein by reference.

In addition to signaling traffic, SN 2110 can also receive media traffic from content servers 2250, such as camcorders, external cameras, or proxies for same. A logical function called the Media Leg Manager (MLM) 2240 handles this media traffic, using protocols such as RTP, IP, and/or RTSP. Media traffic may also be re-directed by SN 2110 under roaming scenarios, as described in greater detail in U.S. Patent Pub. No. 2006/0291412, the entire contents of which are incorporated herein by reference. Various media servers and content servers will be not necessarily be aware of SN 2110; rather, SN 2110 may act as a proxy and retrieve content and media from such servers, then process it and transmit it to mobile handsets. In order to carry out these functions, SN 2110 supports various proxy functions.

Figure 16:
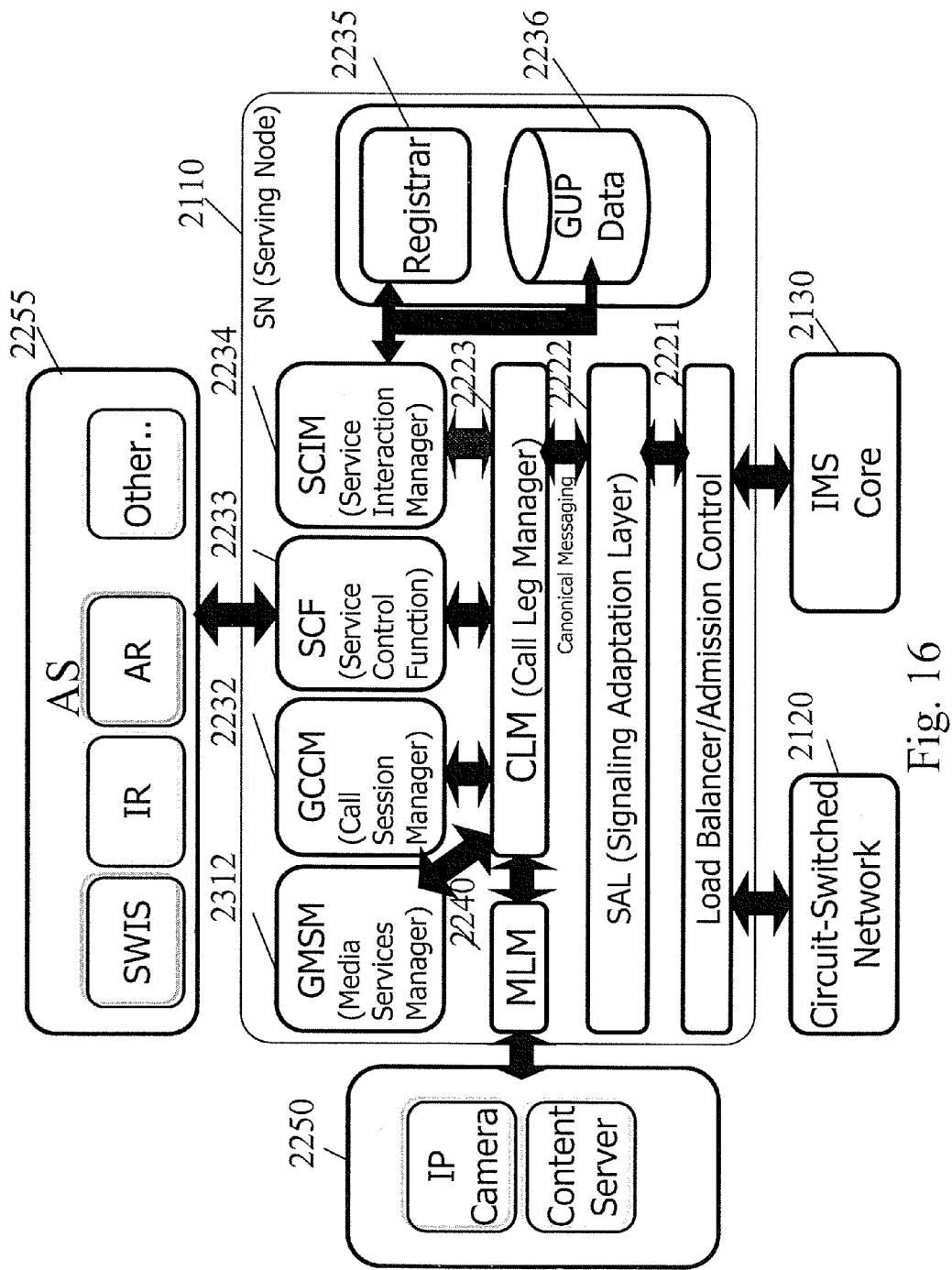
FIG. 16 illustrates the logical components of the serving node (SN) component of the service delivery platform (SDP).

SN 2110 supports a variety of combinational services, some examples of which are described below, and also provides an interface for supporting $3^{rd}$ party Application Servers (AS) 2255 (see, e.g., FIG. 16). These services, as stated earlier, generally involve contemporaneous circuit-switched and packet-switched connections. Some examples of such services as "See What I See" (SWIS) one "Image Ring" (IR)

and "Ad Ring" (AR). The architecture of SN 2110 includes SCF 2233 and Registrar 2235 components cooperatively to make such services possible. In those cases where an external media service is needed, the proxy components of SN 2110 may be used to receive the external media, process it internally for use in mobile handsets, and then transmit the media to the handsets. Under roaming situations, SN may also use its mobility management components as described in greater detail in U.S. Patent Pub. No. 2006/0291412, the entire contents of which are incorporated herein by reference, to ensure that a favorable network connection is used to deliver the media to the roaming mobile handset. In particular, services from the circuit-switched and packet-switched networks may be combined in various temporal sequences and modalities. SN 2110 contains a Service Control Interaction Manager (SCIM) 234 component that uses policy driven service logic to resolve feature interactions when services are combined from different or the same networks are combined in various ways.

For security, privacy, management and efficiency reasons, the PS logic only responds to messages from SN. And since it is only the SN that is aware of both the PS and CS connections and impending and ongoing call state information, the SN is useful in delivering and coordinating the advertisements. The PA logic provides flexibility in which advertisements are shown when to the recipient. However, it is possible to envision a system in which the PA logic is not used to provide such flexibility. In this embodiment, a fixed rendering mechanism may be used (e.g., provided by the handset manufacturer) in the handset that employs a single algorithm to render the advertisements. This algorithm may be updated by sending an SMS message to the recipient handset. The user is then required to "click" on the received SMS message that causes a new algorithm to be loaded from the SN on to the handset.

Personal Agent Component of the Service Delivery Platform

A special piece of service logic installed in a user's handset is referred to as the Personal Agent (PA). The basic architecture of PA 2185 assumes that the handset supports connections to both the circuit-switched (CS) network 2120 and the packet-switched (PS) network 2190, which are described in greater detail above. Generally, some handsets simultaneously support connections to both networks, and other handsets support a connection to only one network at a time. Here, the handset is assumed to support a number of CS signaling channels (CS Sch 1-$n$), and also a number of PS signaling channels (PS Sch 1-$n$). Thus, when a network entity such as SN 2110 sends a message to PA 2185 via CS network 2120 or PS network 2190, the message arrives at the corresponding signaling channel (CS Sch 1-$n$ or PS Sch 1-$n$).

Figure 17:
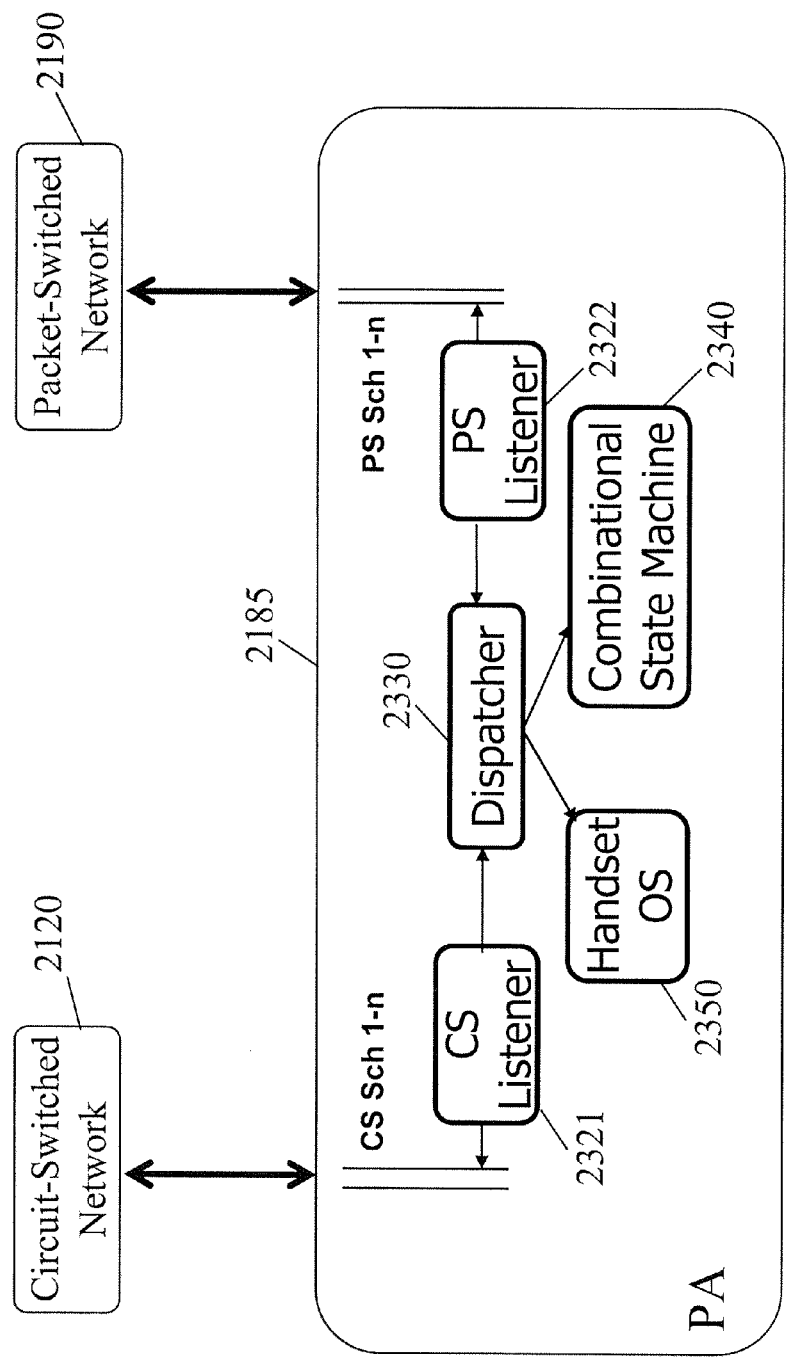
FIG. 17 illustrates the logical components of the personal agent (PA) component of the service delivery platform (SDP).

As illustrated in FIG. 17, the PA includes CS "Listener" 2321 and PS "Listener" 2322, which receive messages on the signaling channels (CS Sch 1-$n$) and (PS Sch 1-$n$), respectively. CS Listener 2321 and PS Listener 2322 direct these messages to another service logic component called the "Dispatcher" 2330. Dispatcher 2330 uses internal logic to direct the messages appropriately either to the handset's operating system (OS) 2350 or to the Combinational State Machine 2340. Combinational State Machine 2340 handles the message according to its service logic. The actions of the combinational state machine are specific to the service that is being implemented.

As an illustrative example, consider a combinational service in which party A wishes to transmit a picture to party B while making a circuit-switched switched voice call to party B. Further assume that the underlying wireless network does not support multiple radio access bearers (mRAB). Thus, both handsets already share a CS connection, and not a PS connection. In such a case, the PA in the handset of party A sends a message e.g., using a USSD message, to the PA in the handset of party B via CS network 2120 and SN 2110. The message includes instructions to end the CS voice call; initiate a PS connection to receive the picture; and to end the PS connection.

The appropriate Listener in party B's handset receives the message and transmits it to the Dispatcher, which then sends it to the Combinational State Machine. The Combinational State Machine in party B's handset then interprets the message, terminates the CS voice call, initiates a PS connection to receive the picture and, after receiving the picture, terminates the PS connection. Then, the Combinational State Machine in party A's handset initiates a new CS voice call to party B's handset, and the parties can continue talking.

Some other illustrative examples of combinational services that the service delivery platform provides will now be described.

Because the service delivery platform has knowledge of both the CS and PS networks, the platform could be said to be aware of the circuit and packet components of combinational services. Specifically, the SN and the PA can be used together to synchronize a packet-switched connection with a circuit-switched connection in the user's handset, even if the handset itself cannot simultaneously support both kinds of connections.

User-Initiated Video Transfer

An embodiment of a system that can facilitate the real-time transfer of video from a handset to a personal computer via the Internet is the Service Delivery Platform (SDP) described in detail in U.S. Patent Pub. No. 2007/0197227, which is incorporated herein by reference in its entirety. Descriptions of other systems and/or components may be found in the incorporated patent references, provided below.

Transmitting multimedia objects between handsets and network entities is a fundamental capability of the SDP. In particular, the PA (service logic resident in the handset) aids in the selection of an object, creates a "network path" from the handset "A" to the SN. The SN can then establish a second "network path" from the handset "A" either to a specialized Application Server (AS) to provide the desired service, or to another handset "B" (or even a plurality of handsets). The setting up of the network paths is preceded by control information ("signaling") that aids in setting up the paths and the transmittal of the selected object is typically referred to as "bearer" traffic. The two network paths are more typically referred to as "call legs." Embodiments of appropriate signaling protocols between the handsets and network entities is described below.

Assume that user "A" records a video stream using a handset. In one embodiment, the user forwards that video stream in real time to the handset of user "B" using the SDP by utilizing conventional "call forwarding techniques" in a non-conventional way. In particular, the SN establishes a PS connection between the handset and the "forwarded to" handset, via the "forwarded to" handset's mobile station. The SN in conjunction with service logic PA resident in the handset, ensures that the called party number and "connected to" number are identical; if not, it senses that Call Forwarding has been initiated by the consumer and ensures that the PS connection is established with the "connected to" number and not the "called party number." The handset "A" then transmits the video stream via the PS connection to handset "B" via the established PS connection.

In another embodiment, the user forwards the video stream in real time to a URL. In this embodiment, the SDP ensures that a PS connection is established with the URL designated by the user. The utility of this case is further enhanced by the consideration that if the mobile station does not respond, the CS connection (as per standard telephony practice) will be forwarded to a voice mail server. But the CS connection (i.e., CS network) is unaware that the underlying call was a combinational call. Hence the multimedia segment of the call will be lost. Forwarding to a URL ensures that this information can also be made available to the consumer at a later time. The SN supports the URL mechanism through a "proxy mechanism." The proxy acts as a mobile station when interfacing with the SN, thus no change is needed in the service logic of the SN (it is as if dealing with another mobile handset). On the other side, the proxy interfaces with the storage server (either local to SN or third party) using the protocol that the storage server accepts. In other words, the proxy acts as a client when interfacing with the storage server. The details of this client interface are dependent on the storage server implementation, e.g., the storage server may be a Web portal supporting a SOAP/XML interface.

Network-Initiated Video Transfer

In some cases the SN may initiate a Call Forwarding to URL event on behalf of the called party. As a first example, assume that a called party roams out of 3G to 2G coverage while a call is in progress in which case the PS connection will normally be dropped while the CS (voice) connection will be preserved by the wireless network; as a further extension of this case the quality of service available for the PS connection may be poor and the SDP may decide to "record" by initiating Call Forwarding to URL event. In a second example, assume that the called party does not possess a 3G UMTS handset (has a 2G or 2.5G handset only) and thus can not support a combinational service.

In the first example, the SN is in the path of the multimedia stream (acting as B2BUA in IMS networks and as a SDP in non-IMS networks). By way of example, SN receives RTCP information from called party mobile station (i.e., from service logic PA resident in the called party handset) that indicates the rate of acceptance of multimedia traffic at the called party handset. Service logic in SDP interprets this rate and uses it as a trigger to initiate Call Forwarding to URL. As practitioners skilled in the art know, the timeliness of RTCP reports is "near real time;" however, new reporting protocols are under discussion in various standard's bodies and forums that provide more timely reporting information. The present invention is not limited in its scope by its use of RTCP and use of other reporting technologies is envisaged in various embodiments.

In the second example, combinational calls at origination undergo a service negotiation phase during which codec and other parameters to be used in the service are negotiated. If the called party handset is not a 3G/UMTS handset (or does not possess service logic that supports the afore-mentioned combinational service), it will not respond (or will respond incorrectly) to the service negotiation request from the calling party handset. In such a case SN may use this information as a trigger to initiate Call Forwarding to URL event.

In a further embodiment, PS sessions that are Call Forwarded to URL may be stored (i.e., preserved) for future perusal and made available to consumers, e.g. last five Video Share sessions made available to the called party, in an offline process.

FIG. 1 schematically illustrates a high-level overview of the components of a system capable of providing real-time handset to personal computer video transfer via the Internet according to some embodiments. Initiator handset 11 makes a voice call 12 to the recipient handset 13. Initiator handset 11 exchanges options with recipient handset 13 via SDP 0140 to assess if recipient handset 13 is capable of the service. SDP 14 gets indication from recipient handset 13, and notifies initiator handset 11 (e.g., with a "blue" indicator) conveying that recipient handset 13 is not capable of an integrated experience (i.e., it is not capable of using mRAB technology). Initiator handset 11 starts sharing video with the SDP 14. SDP 14 adapts the format to a web conducive format and passes content to portal server 15. Portal server 15 notifies user portal 16 of an incoming video availability. Alternatively, user portal 16 receives this information via the voice call 12 and seeks access to portal server 15. Portal 16 retrieves video from portal server 15 using a web based interface using a streaming protocol.

Figure 2:
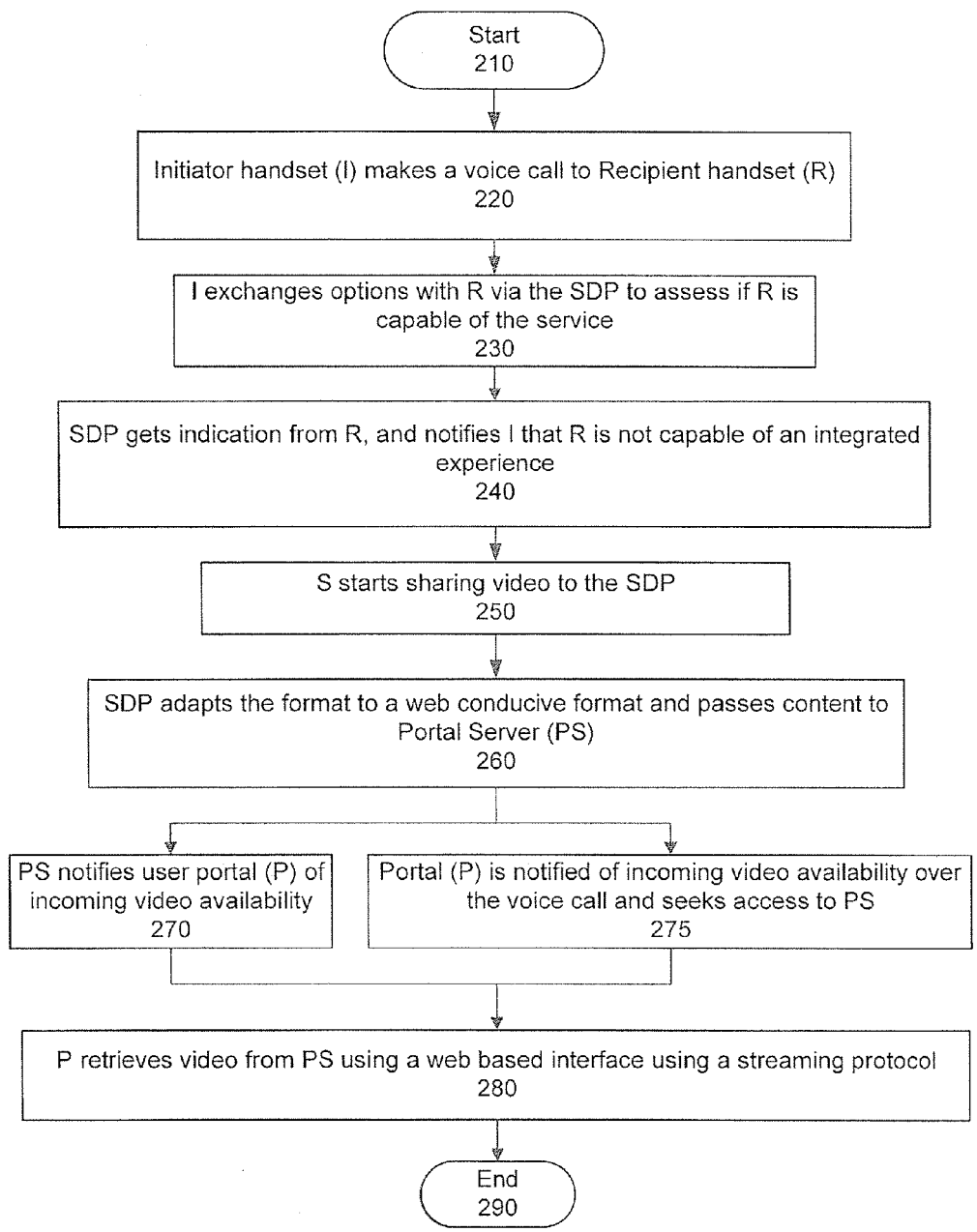
FIG. 2 illustrates an exemplary flow chart according to one embodiment of the invention.

FIG. 2 illustrates the sequence of steps according to the embodiment of FIG. 1. The steps are as follows:
1. Initiator handset (I) makes a voice call to the Recipient handset (R);
2. I exchanges options with R via the SDP to assess if R is capable of the service;
3. SDP gets indication from R, and notifies S (e.g., with a "blue" indicator) conveying that R is not capable of an integrated experience;
4. S starts sharing video with the SDP;
5. SDP adapts the format to a web conducive format and passes content to Portal Server (PS);
6. PS notifies user portal (P) of an incoming video availability; or P gets this information via the voice call and seeks access to PS; and
7. P retrieves video from PS using a web based interface using a streaming protocol.

Figure 3:
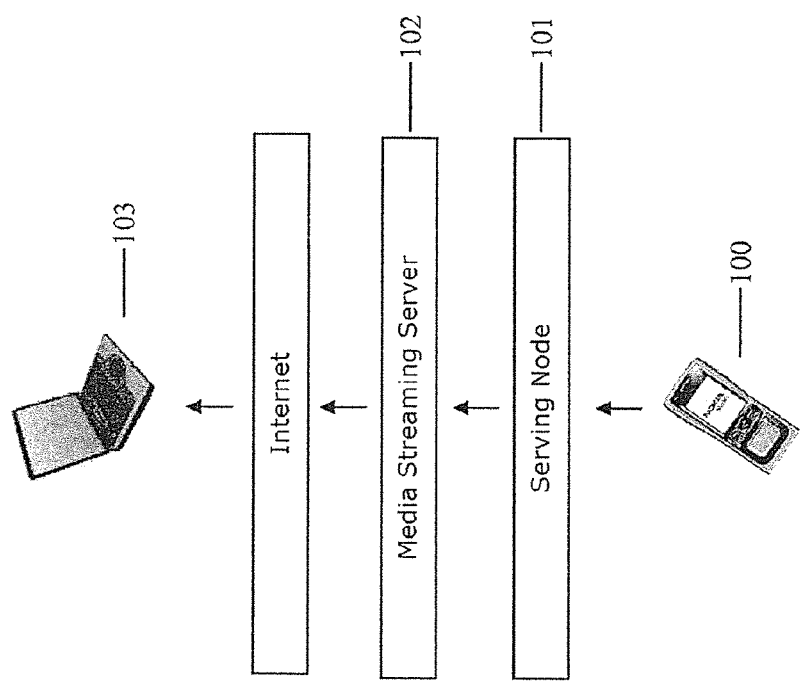
FIG. 3 illustrates an architecture allowing a cellular phone to stream video to an application server according to one embodiment of the invention. The application server streams the video to one or more Media Streaming servers. The Media streaming server(s) take this video and make it available via an Internet URL. Personal computers connected to the Internet can access a URL to view the video, according to some embodiments.

FIG. 3 schematically illustrates a high-level overview of the components of a system capable of providing real-time handset to personal computer video transfer via the Internet according to some embodiments. The handset 100 is connected to the Serving node 101, using signaling protocols as described above. The cellular phone 100 streams the video to the Serving Node 101 via the PS network. The Serving Node 101 is responsible for creating/maintaining/destroying video sessions between 100 and another cellular phone or a media streaming server 102. The Serving Node 101 streams the video to one or more third party media streaming server(s) 102. The media server(s) make(s) available this video through an Internet URL. Personal computers 103 connect to the media streaming servers using the Internet to get access to the streamed video.

As one of skill in the art will understand, due to various delays introduced in the cellular-to-video transfer protocol, the video display may lag slightly behind the voice call. For purposes of this application, this is still considered to be "real-time" video transfer.

User Interfaces

Figure 4:
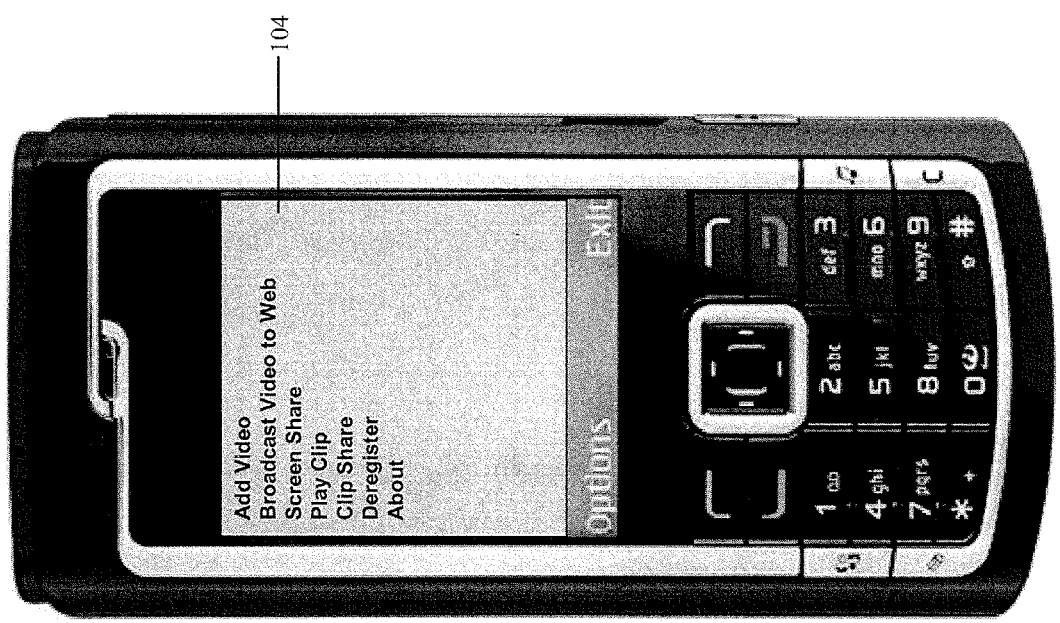
FIG. 4 is a schematic of the initiation of a video session using a cellular handset initiates a video session. A software application on the phone presents the menu choice "Broadcast Video to Web" which is the first step to initiate the video session, according to some embodiments.

FIGS. 4-12 illustrate exemplary handset and personal computer interfaces that can be used to facilitate a video streaming session. Those of skill in the art will appreciate that the interfaces can be readily adapted to handset-to-handset video streaming. As illustrated in FIG. 4, in one embodiment, while the cellular phone 100 is engaged in a voice call the handset software displays a menu allowing the user to add a combinational service to the call, e.g., makes the "Broadcast Video to Web" option 104 available to the user (among other options). When the user selects this option using the phones navigation interface, the video session is initiated.

Since the Video broadcast will finally be made available on a static Internet URL in the illustrated embodiment, restriction may be imposed on who gets access to the video. This can be done by a dynamic password mechanism illustrated in FIG. 5. Specifically, the handset 100 accepts a dynamic password entered by the user. The handset then propagates this password to the media streaming server 102. When a user on the internet attempts to access the URL he/she is presented a dialog box where he/she has to enter the password to be able to view the video. The password being set in FIG. 5 will be the same password that will be accepted in FIG. 11.

In some embodiments, the password expires as soon as the video session is terminated, and each new video session begins with a fresh password. The password can be left blank in which case no authentication is required to view the video broadcast. The OK 106 button saves the password. The Cancel button 105 exits the video session. The text field 107 accepts the password in masked text.

Figure 6:
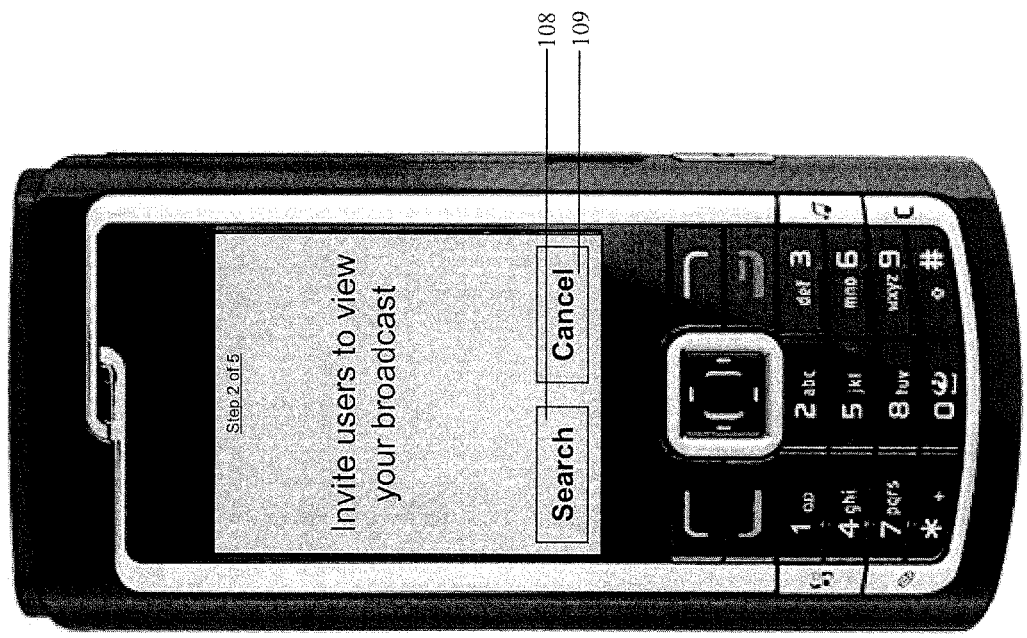
FIG. 6 is a schematic of the use of handset software to send out invites as SMS, MMS, and Email according to some embodiments.

FIG. 6 illustrates an interface for sending "Invite" messages to other users to view the video session by way of SMS, MMS, and Email according to some embodiments. The Search button 108 launches the Address book search feature of the cellular phone. The Cancel button 105 exits the video session. The invite message, when sent, contains the URL at which the Video broadcast can be accessed and the Inviters name. Invite messages are one way of Notifying users apart from the voice call itself.

Figure 7:
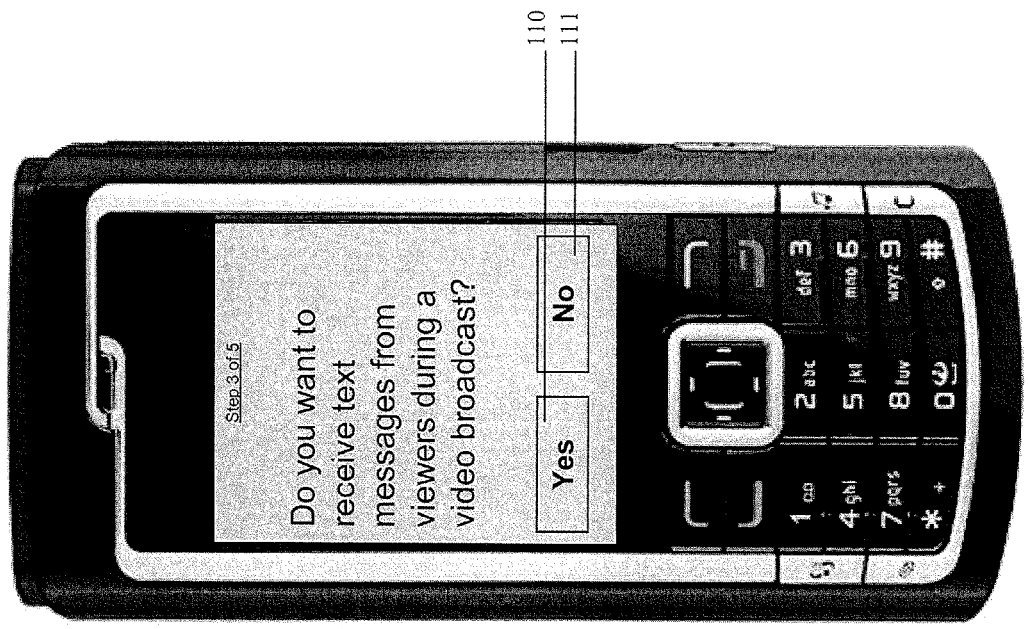
FIG. 7 is a schematic of the use of the handset software to enable or disable the text chat feature prior to beginning a video session according to some embodiments.

FIG. 7 illustrates an interface for enabling or disabling the handset's ability to receive text messages before the Video session is initiated according to some embodiments. The YES button 110 enables receiving of text messages. The NO button 111 disables receiving of text messages. With the Text messages enabled, text messages can be exchanged between the cellular phone 100 and the personal computer 103 simultaneously with the video session.

Figure 8:
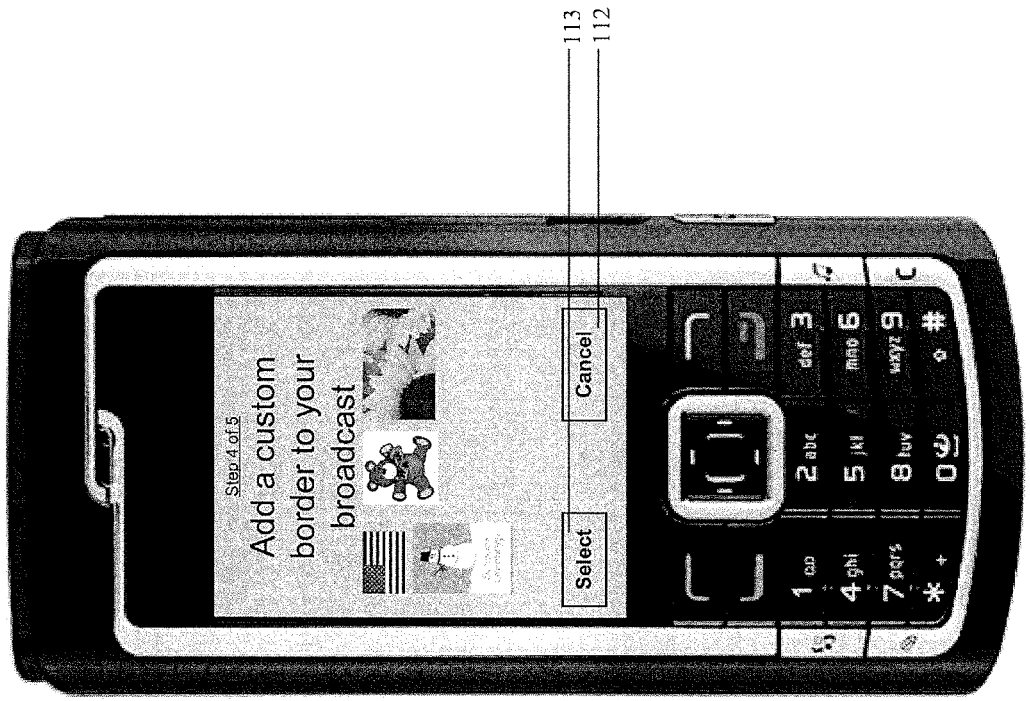
FIG. 8 is a schematic of the use of the handset software to add a custom border to the video broadcast according to some embodiments.

FIG. 8 illustrates an interface for adding a custom border around the video stream, to be displayed to the users viewing the stream according to some embodiments. The handset software presents the user with a list of border styles to select from. The Select button 113 selects the border style. The Finish button 112 skips the section.

Figure 9:
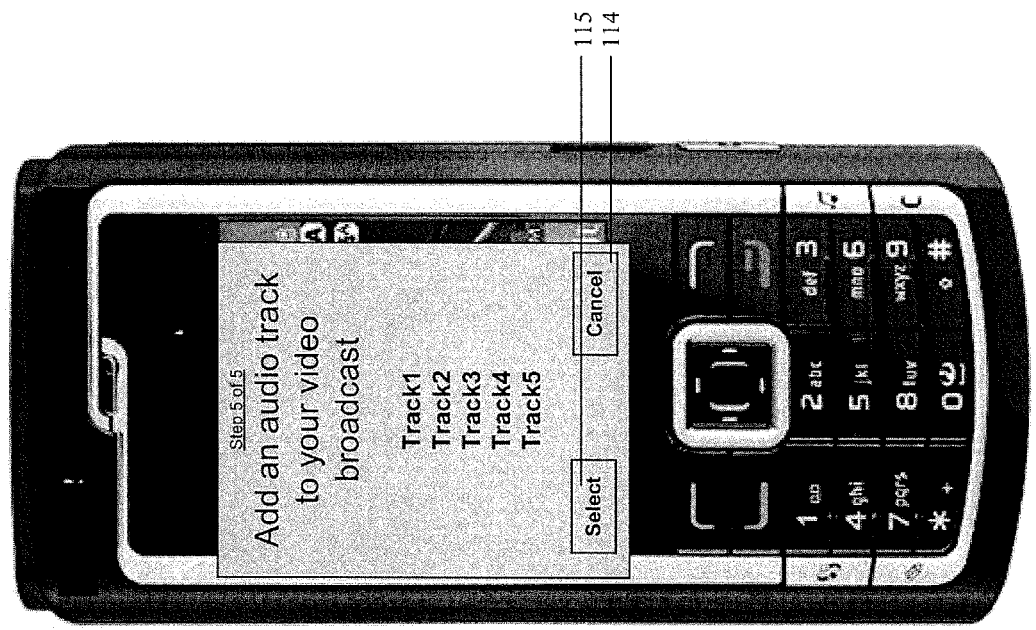
FIG. 9 is a schematic of the use of the handset software to select an audio track to add to the video broadcast according to some embodiments.

FIG. 9 illustrates an interface for adding a user selectable audio track to be played concurrently with the video stream according to some embodiments. The Select button 115 fetches all audio content stored in the phone memory. The Cancel button 114 exits the video session.

Figure 10:
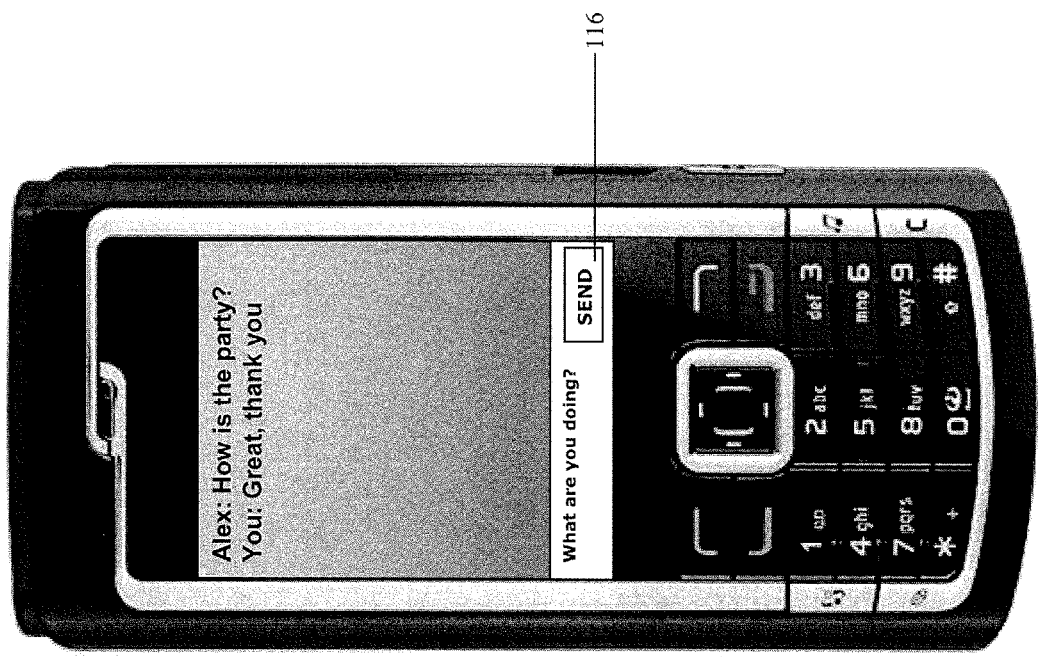
FIG. 10 is a schematic of the use of the handset software to engage in a text chat while the video session is in progress according to some embodiments.

FIG. 10 illustrates an interface for allowing text messages exchanged between the cellular handset 100 and the personal computer 103 according to some embodiments. On the handset the user will see the video the handset is broadcasting. The text messages overlap the video. At the bottom of the screen are a text field and a Send button 116. The Send button sends the text contained in the text field. In some embodiments, the screen shows text sent by both or all parties involved in the conversation.

As described above, the systems and methods allow users with personal computers connected to a network to be able to receive the video broadcast. The users will have to access an Internet URL, e.g., a URL transmitted from the handset to the personal computer users via an "Invite" message. Upon accessing the Internet URL, in some embodiments the user will be presented with an authentication screen such as that illustrated in FIG. 11. In some embodiments, to be able to login, prior registration is not necessary. In some embodiments, the username to be entered will be the viewer's own name. The username helps other participants/viewers of the video stream to identify who else is watching the broadcast. The same username also helps in identifying participants while text messages are exchanged. The username may be entered in the username text field 120.

Figure 5:
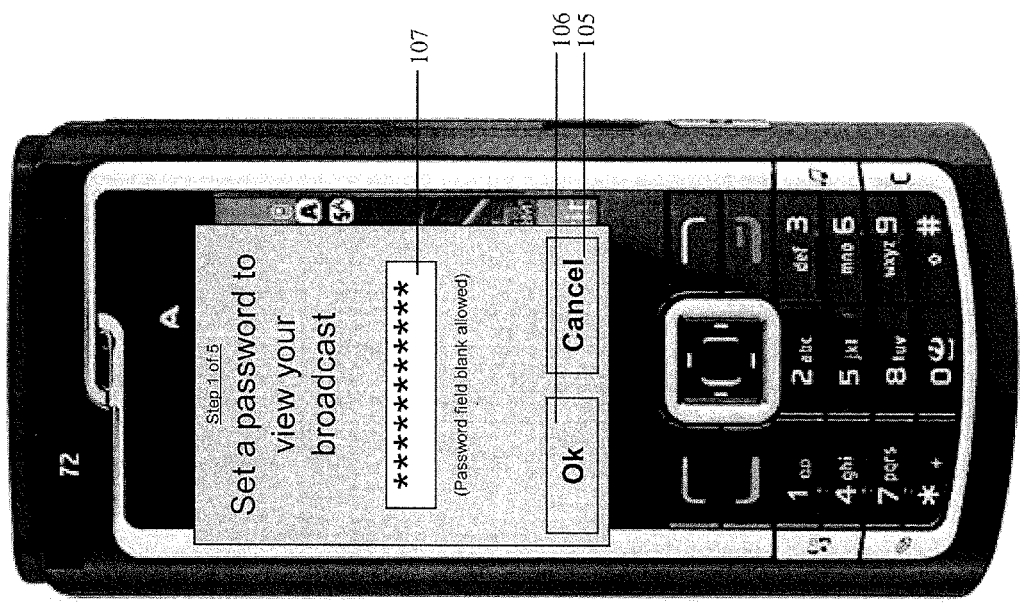
FIG. 5 is a schematic of the creation of an authentication mechanism on the handset according to some embodiments.
Figure 11:
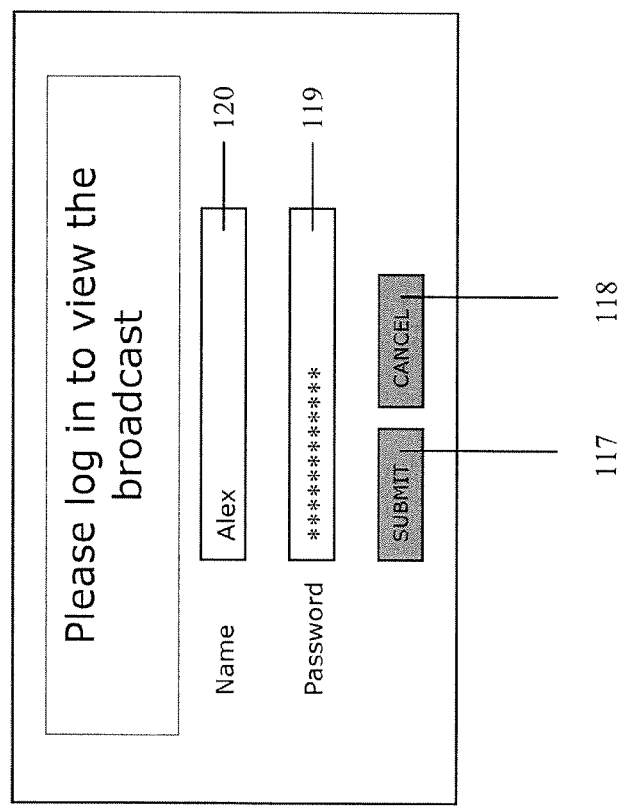
FIG. 11 is a schematic of the use, at a personal computer, of the created authentication mechanism to access the video session via the internet according to some embodiments.

In the screen illustrated in FIG. 11, in some embodiments the password to be entered was previously established, e.g., using the handset interface illustrated in FIG. 5. The password may be used to prevent unwanted viewers from being able to watch the video broadcast. In some embodiments, the password is transmitted from the initiating handset to the users invited to watch the video through, e.g., SMS, MMS, EMAIL, or even verbally through a voice call. The system accepts the password through the Password field 119. The Submit button 117 submits the username and password for authentication. The Cancel button 118 aborts the authentication process.

Figure 12:
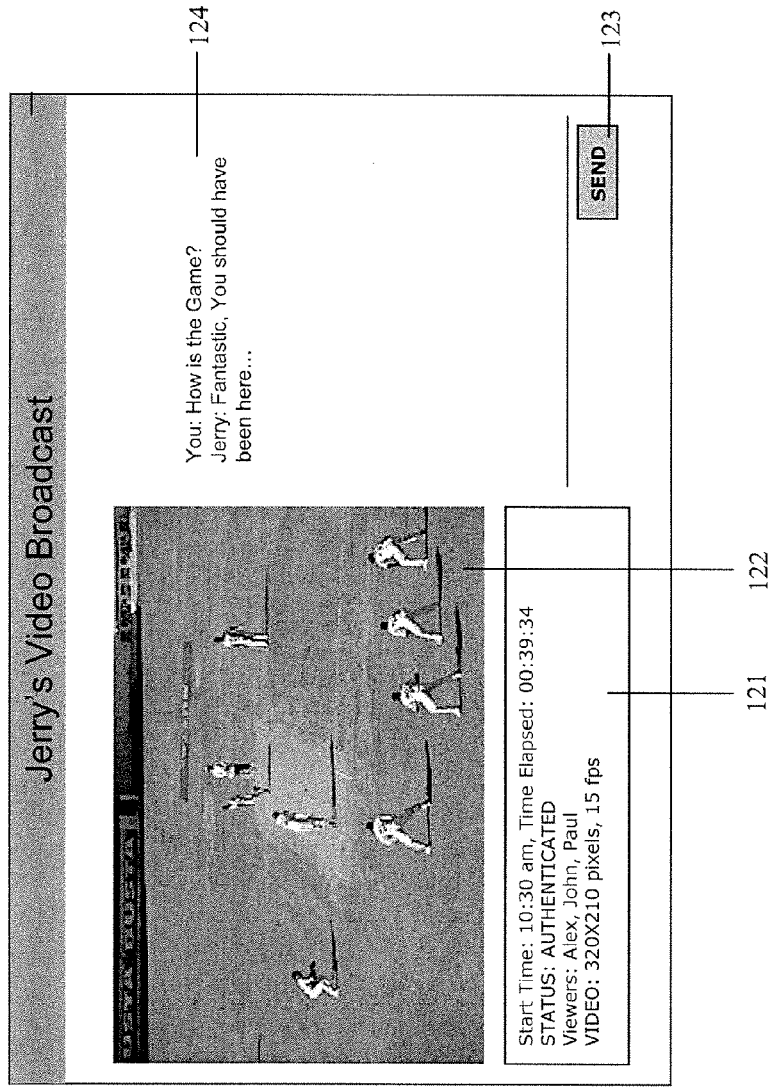
FIG. 12 is a schematic of a graphic user interface at a personal computer that displays the video broadcast as well as text messages being exchanged simultaneously with the handset user according to some embodiments.

FIG. 12 illustrates an exemplary personal computer user interface through which a successfully authenticated user can view the video as well as chat with other users, according to some embodiments. The video screen 122 is where the viewer gets to watch the video being streamed from the cellular handset 100. The video details screen 121 presents the user with information like when the video broadcast was started, the duration for which the broadcast has been running, the viewers viewing the broadcast, Video size. Simultaneously, the viewer using the personal computer 103 can exchange text messages with the user with the cellular handset 100. This textual conversation is common to all participants viewing the broadcast. The text messages appear in the messages window 124. The SEND button 123 sends a new text message.

In some embodiments, the page title 125 identifies the owner of the video feed.

Embodiments of the present invention build on techniques, systems and methods disclosed in earlier filed applications, referred to herein as the "incorporated patent references," including but not limited to the following references, the entire contents of which are incorporated herein by reference:

U.S. Patent Pub. No. 2007/0197227, entitled System and Method for Enabling Combinational Services in Wireless Networks By Using a Service Delivery Platform; U.S. Patent Pub. No. 2006/0291437, entitled System and Method to Provide Dynamic Call Models for Users in an IMS Network; U.S. Patent Pub. No. US 2007/0008913, entitled Method and System for Provisioning IMS Networks with Virtual Service Organizations Having Distinct Service Logic; U.S. Patent Pub. No. US 2006/0291484, entitled Method of Avoiding or Minimizing Cost of Stateful Connections Between Application Servers and S-CSCF Nodes in an IMS Network with Multiple Domains; U.S. Patent Pub. No. 2007/0008951, entitled Mediation System and Method for Hybrid Network Including an IMS Network; U.S. Patent Pub. No. 2006/0291412, entitled Associated Device Discovery in IMS Networks; U.S. Patent Pub. No. 2006/0291487, entitled IMS Networks with A VS Sessions with Multiple Access Networks; U.S. Patent Pub. No. 2006/0291488, entitled System and Method of Interworking Non-IMS and IMS Networks to Create New Services Utilizing Both Networks; U.S. Patent Pub. No. 2006/0291489, entitled System and Method to Mediate Delivery of Legacy, Non-IMS Services into an IMS Network; U.S. Patent Pub. No. 2006/0294244, entitled Digital Home Networks Having a Control Point Located on a Wide Area Network; U.S. patent application Ser. No. 11/709,469, filed Feb. 22, 2007, entitled System and Methods for IP Signaling in Wireless Networks; and U.S. patent application Ser. No. 11/787,635, filed Apr. 17, 2007, entitled Systems and Methods for IMS User Sessions with Dynamic Service Selection.

It will be further appreciated that the scope of the present invention is not limited to the above-described embodiments, and that the invention encompasses modifications of and improvements to what has been described.

What is claimed is:

1. A method for supporting combinational services to a recipient handset from an initiator handset using a portal on a Serving Node (SN) as a proxy for the recipient handset for delivering packet services on a packet switched (PS) network during a voice call between the initiator handset and the recipient handset, when the recipient handset is incapable of supporting combinational services, the method comprising:
   communicating with the initiator handset and the recipient handset;
   exchanging information comprising connectivity options between the initiator handset and
   the recipient handset;
   initiating a voice call between the recipient handset and the initiator handset over a circuit switch (CS)
   network;
   determining that the recipient handset cannot support combinational services;
   receiving a request to initiate combinational services from personal agent (PA) logic stored
   in memory of the initiator handset, the combinational services request comprising a request for a packet service via the PS network;
   configuring the portal on the SN for delivery of the packet service to the recipient handset;
   migrating the voice call to a packet session on the PS network; and
   adding the packet service to the packet session on the PS network,
   wherein, while a call or session is in progress, and without disconnecting the voice call or session, the SN provides combinational services to the recipient handset through a connection between the initiator handset and only one of the CS network and PS network at any given time.

2. The method of claim 1, further comprising the initiator handset providing an authentication requirement to the portal on the SN.

3. The method of claim 1, further comprising the recipient device providing authentication information to the portal on the SN, wherein authentication is required to access the packet service.

4. The method of claim 1, further comprising the SN contacting the recipient handset to determine if the recipient handset is on a wireless network utilizing multiple Radio Access Bearer (mRab) technology.

5. The method of claim 1, wherein the recipient handset is temporarily incapable of supporting combinatorial services.

6. The method of claim 1, wherein the recipient handset is permanently incapable of supporting combinatorial services.

7. The method of claim 1, wherein the combinational services comprises delivering a real-time video stream on the packet switched (PS) network from an initiator handset to a recipient during the voice call.

8. The method of claim 7, further comprising the initiator handset notifying the recipient handset via a SMS message, a MMS message, an IM message, an Email message or a voice call of the packet service.

9. The method of claim 1, wherein configuring the portal on the SN for delivery of the packet service comprises establishing a connection between the portal on the SN and a recipient device proximate to the recipient handset, wherein the recipient device is capable of receiving the packet service.

10. The method of claim 9, wherein the recipient device retrieves the packet service from the portal on the SN through the internet.

11. The method of claim 9, wherein the recipient device comprises a computer.

12. The method of claim 9, further comprising the SN notifying the recipient device of the packet service availability.

13. The method of claim 12, wherein the recipient device is notified of the packet service via a SMS message, a MMS message, an IM message, or an E-mail message.

14. The method of claim 9, further comprising the SN converting the packet service into a format that can be presented on the recipient device prior to directing it to the portal on the SN.

15. The method of claim 14, wherein the format is capable of being played in an internet browser.

16. The method of claim 9, wherein the initiator handset is capable of exchanging SMS, MMS, IM or E-mail messages with the recipient handset or recipient device during the packet service.

17. The method of claim 9, wherein packet service with the recipient handset through the recipient device via the SN is enabled by effectuating a Call Forwarding to URL.

18. A system for supporting combinational services to a recipient handset from an initiator handset when the recipient handset is incapable of supporting combinational services, using a portal on a Serving Node (SN) as a proxy for the recipient handset for delivery packet services on a packet switched (PS) network during a voice call between the initiator handset and the recipient handset, the system comprising:
   the SN in wireless communication with both the initiator handset and the recipient handset,
   wherein the SN comprises logic stored in memory for:
   communicating with the initiator handset and the recipient handset;
   exchanging information comprising connectivity options between the initiator handset and the recipient handset;
   initiating a voice call between the recipient handset and the initiator handset over a circuit switch (CS) network;
   determining that the recipient handset cannot support combinational services;
   receiving a request to initiate combinational services from personal agent (PA) logic stored
   in memory in the initiator handset, the combinational services request comprising a request for a packet service via the PS network;
   configuring the portal on the SN for delivery of the packet service to the recipient handset;
   migrating the voice call to a packet session on the PS network; and
   adding the packet service to the packet session on the PS network,
   wherein, while a call or session is in progress, and without disconnecting the voice call or session, the SN provides combinational services to the recipient handset through a connection between the initiator handset and only one of the CS network and PS network at any given time.

19. The system of claim 18, wherein the recipient handset is temporarily incapable of supporting combinatorial services.

20. The system of claim 18, wherein the recipient handset is permanently incapable of supporting combinatorial services.

21. The system of claim 18, wherein the combinational services comprises delivering a real-time video stream on the packet switched (PS) network from an initiator handset to a recipient.

22. The system of claim 21, wherein the video is generated by an internal camera on the initiator handset or obtained from a server.

23. The system of claim 18, wherein configuring the portal on the SN for delivery of the packet service comprises establishing a connection between the portal on the SN and a recipient device proximate to the recipient handset, wherein the recipient device is capable of receiving the packet service.

24. The system of claim 23, wherein the recipient device is a computer.

25. The system of claim 23, wherein the SN comprises logic for effectuating a Call Forwarding to URL to enable the packet service with the recipient through the recipient device via the SN.

* * * * *